United States Patent
Wang et al.

(10) Patent No.: US 12,408,140 B2
(45) Date of Patent: Sep. 2, 2025

(54) DATA TRANSMISSION METHOD AND APPARATUS

(71) Applicant: Huawei Technologies Co., Ltd., Shenzhen (CN)

(72) Inventors: Hong Wang, Beijing (CN); Lei Chen, Beijing (CN); Bin Xu, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 454 days.

(21) Appl. No.: 17/852,672

(22) Filed: Jun. 29, 2022

(65) Prior Publication Data

US 2022/0330203 A1 Oct. 13, 2022

Related U.S. Application Data

(63) Continuation of application No. PCT/CN2019/130736, filed on Dec. 31, 2019.

(51) Int. Cl.
  *H04W 68/00* (2009.01)
  *H04W 72/1263* (2023.01)
  *H04W 72/23* (2023.01)

(52) U.S. Cl.
  CPC ..... *H04W 68/005* (2013.01); *H04W 72/1263* (2013.01); *H04W 72/23* (2023.01)

(58) Field of Classification Search
  CPC .............. H04W 68/005; H04W 72/23; H04W 72/1263
  See application file for complete search history.

(56) References Cited

U.S. PATENT DOCUMENTS

| | | | |
|---|---|---|---|
| 2017/0230994 A1* | 8/2017 | You | H04L 5/0053 |
| 2019/0150187 A1* | 5/2019 | Park | H04L 5/0094 |
| | | | 370/330 |

(Continued)

FOREIGN PATENT DOCUMENTS

| | | |
|---|---|---|
| CN | 105992373 A | 10/2016 |
| CN | 109474998 A | 3/2019 |

(Continued)

OTHER PUBLICATIONS

3GPP TS 38.300 V15.7.0 (Sep. 2019), "3rd Generation Partnership Project; Technical Specification Group Radio Access Network; NR; NR and NG-RAN Overall Description; Stage 2(Release 15)," 99 pages.

(Continued)

*Primary Examiner* — Shukri Taha
(74) *Attorney, Agent, or Firm* — Slater Matsil, LLP

(57) ABSTRACT

A method and an apparatus are provided. The method includes: An access network device sends DCI for a paging message to a terminal device, where the DCI includes scheduling information for downlink data. The access network device further sends first indication information included in the paging message to the terminal device, wherein the first indication information indicates that first downlink data corresponds to the terminal device. Therefore, when determining that there is downlink data to arrive, the terminal device determines a time-frequency location of the downlink data based on the scheduling information that is for the downlink data and that is in the DCI, and then receives the downlink data at the time-frequency location. According to the method and the apparatus provided in this application, a small amount of downlink data is transmitted, resource utilization is improved, and power consumption of the terminal device is reduced.

20 Claims, 14 Drawing Sheets

(56) References Cited

U.S. PATENT DOCUMENTS

| | | | |
|---|---|---|---|
| 2019/0223160 A1* | 7/2019 | He | H04W 68/005 |
| 2019/0239187 A1* | 8/2019 | Islam | H04L 5/0048 |
| 2019/0320455 A1 | 10/2019 | Chen et al. | |
| 2020/0029303 A1* | 1/2020 | Liu | H04W 28/0215 |
| 2020/0252907 A1* | 8/2020 | Rune | H04W 8/24 |
| 2022/0104172 A1* | 3/2022 | Chen | H04W 48/12 |

FOREIGN PATENT DOCUMENTS

| | | | | |
|---|---|---|---|---|
| CN | 109803407 A | 5/2019 | | |
| CN | 110536434 A | 12/2019 | | |
| EP | 3917241 A1 | 12/2021 | | |
| WO | 2013054979 A1 | 4/2013 | | |
| WO | 2019028589 A1 | 2/2019 | | |
| WO | WO-2019099661 A1 * | 5/2019 | | H04B 7/00 |

OTHER PUBLICATIONS

3GPP TS 38.321 V15.7.0 (Sep. 2019), "3rd Generation Partnership Project; Technical Specification Group Radio Access Network; NR; Medium Access Control (MAC) protocol specification(Release 15)," 78 pages.

3GPP TS 38.322 V15.5.0 (Mar. 2019), "3rd Generation Partnership Project; Technical Specification Group Radio Access Network; NR; Radio Link Control (RLC) protocol specification(Release 15)," 33 pages.

3GPP TS 38.323 V15.6.0 (Jun. 2019), "3rd Generation Partnership Project; Technical Specification Group Radio Access Network; NR; Packet Data Convergence Protocol (PDCP) specification (Release 15)," 26 pages.

"Principles of New DCI for MTC," Agenda Item: 7.2.1.2, Source: Huawei, HiSililcon, Document for: Discussion and Decision, 3GPP TSG RAN WG1 Meeting #82, R1-153756, XP051001204, Beijing, China, Aug. 24-28, 2015, 4 pages.

* cited by examiner

DATA TRANSMISSION METHOD AND APPARATUS

CROSS-REFERENCE TO RELATED APPLICATIONS

This application is a continuation of International Application No. PCT/CN2019/130736, filed on Dec. 31, 2019, the disclosure of which is hereby incorporated by reference in its entirety.

TECHNICAL FIELD

This application relates to the field of communication technologies, and in particular, to a data transmission method and an apparatus.

BACKGROUND

In a conventional technology, when no downlink data needs to be transmitted from a network side, no radio resource control (RRC) connection is established between a base station and a terminal. In this case, the terminal is in an idle state (RRC idle state) or an inactive state (RRC inactive state). When downlink data needs to be transmitted from the network side, the base station initiates paging to the terminal, and establishes an RRC connection to the terminal, and the terminal enters a connected state (RRC connected state) from the idle state or the inactive state. A process in which the base station initiates the paging to the terminal and establishes the RRC connection requires exchange of a plurality of pieces of signaling. When the terminal monitors a paging message and determines that the paging message carries an identifier of the terminal, the terminal triggers an RRC connection establishment procedure, and establishes the RRC connection to the base station using a random access process. After the random access process is completed, the base station further needs to set a context of the terminal and configure a bearer of the terminal, to send the downlink data. It can be learned that, the RRC connection establishment procedure needs to be performed to transmit the downlink data, and signaling overheads are caused.

Data transmission in some communication scenarios such as machine type communication (MTC) and narrowband Internet of things (NB-IoT) is characterized by a small amount of data and an uncertain data arrival time point. If a data packet with a small amount of data is transmitted according to an existing downlink data transmission method, utilization of radio resources is low. This is because a large quantity of radio resources are used in an RRC connection establishment procedure, and only a small quantity of radio resources are used for data transmission. In addition, the existing RRC connection establishment procedure includes many steps, and a terminal and a base station need to exchange a plurality of pieces of signaling. This delays transmission of downlink data and increases a transmission delay of the downlink data.

SUMMARY

This application provides a data transmission method and an apparatus, to quickly transmit a small amount of downlink data, improve resource utilization, and reduce power consumption of a terminal device.

According to a first aspect, an embodiment of this application provides a data transmission method. The method is applicable to a first terminal device, and includes: The first terminal device receives downlink control information (DCI) from an access network device, where the DCI is used to schedule a paging message, and is further used to schedule downlink data. Then, the first terminal device receives the paging message from the access network device, where the paging message includes first indication information, and the first indication information indicates that there is first downlink data corresponding to the first terminal device. The paging message is used to page the first terminal device, and further indicates that there is the first downlink data corresponding to the first terminal device. Therefore, the first terminal device receives the first downlink data from the access network device based on the DCI and the first indication information in the paging message.

In a different application scenario, if the first indication information in the paging message indicates that there is no downlink data corresponding to the first terminal device, the first terminal device receives no downlink data.

The method may be performed by a first communication apparatus. The first communication apparatus may be a communication device, or may be a communication apparatus, for example, a chip, that can support the communication device to implement a function required in the method. For example, the first communication apparatus is a terminal device, a chip disposed in the terminal device to implement a function of the terminal device, or another component configured to implement the function of the terminal device. An example in which the first communication apparatus is the terminal device is used in the following description process.

In this embodiment of this application, no complex radio resource control (Radio Resource Control, RRC) connection procedure is required between the terminal device and the access network device. The access network device may send the downlink data to the terminal device after sending the paging message, so that the terminal device can receive the downlink data as early as possible. The downlink data can be transmitted in advance through a simplified signaling or data exchange process, so that resource utilization can be improved, and power consumption of the terminal device can be reduced. In addition, in this embodiment, the paging message does not carry the downlink data or scheduling information for the downlink data, so that a paging capacity is not reduced.

In a possible implementation, the first indication information includes a quantity N of downlink data transport blocks or a quantity N of identifiers of terminals at which downlink data is to arrive. After receiving the paging message, the first terminal device determines, based on the quantity N and a terminal list in the paging message, that there is the first downlink data corresponding to the first terminal device, and therefore the first terminal device receives the downlink data. The first indication information includes at least one piece of indication information. The at least one piece of indication information one-to-one corresponds to an identifier of at least one terminal device in the paging message, and indicates whether there is downlink data corresponding to the at least one terminal device. Optionally, the at least one piece of indication information may be at least one field, and each field is used to indicate whether there is downlink data to arrive at the corresponding terminal device. Specifically, the first indication information may include a terminal device identifier set, the terminal device identifier set includes the identifier of the at least one terminal device, and the identifier of the at least one terminal device one-to-one corresponds to at least one downlink data transport block. Alternatively, the first indication information includes an identifier of a terminal device and/or indication information, where the indication information indicates whether there is downlink data corresponding to each terminal device, or whether there is downlink data corresponding to each terminal device may be jointly indicated by the identifier of the terminal device and the indication information or may be implicitly indicated by the identifier of the terminal device. For example, the first indication information may include only an identifier of the first terminal device and indication information True. For another example, the first indication information may include identifiers of at least two terminal devices and indication information (for example, True or False) corresponding to each terminal device.

In another possible implementation, a pagingrecordlist (an identifier list of paged UE) in the paging message may integrally correspond to one piece of indication information, and the indication information indicates that there is downlink data to arrive at all terminal devices in the pagingrecordlist. For example, the pagingrecordlist in the paging message may include only an identifier of the first terminal device or identifiers of at least two terminal devices, and the indication information corresponding to the pagingrecordlist is True.

In this embodiment of this application, the access network device distinguishes, based on the first indication information in the paging message, the first terminal device at which the downlink data is to arrive, so that after receiving the paging message, the first terminal device can determine whether there is the corresponding downlink data, to correctly receive the downlink data. In addition, the first indication information occupies a small quantity of bits. This helps reduce signaling overheads.

In a possible implementation, the first indication information may include the terminal device identifier set, the terminal device identifier set includes the identifier of the at least one terminal device at which the downlink data is to arrive, and the identifier of the at least one terminal device one-to-one corresponds to the at least one downlink data transport block. After receiving the paging message and when determining that the identifier of the first terminal device is included, the first terminal device determines that there is the first downlink data corresponding to the first terminal device, and therefore receives the downlink data.

In this embodiment of this application, the access network device distinguishes, based on the first indication information in the paging message, the terminal devices at which the downlink data is to arrive, so that after receiving the paging message, the first terminal device can determine whether there is the corresponding downlink data, and determine a downlink data transport block corresponding to the downlink data, to correctly receive the downlink data.

In a possible implementation, scheduling information in the DCI may include second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received. Specifically, the second indication information may indicate, using one bit, that there is the downlink data to be sent to the first terminal device. In this way, after receiving the DCI, the first terminal device may determine that there may be the downlink data to arrive.

In this embodiment of this application, the access network device transmits the second indication information using the DCI, to indicate that there is the downlink data to be sent to the terminal device, so that the terminal device can receive the downlink data as early as possible. The downlink data can be transmitted in advance through the simplified signaling or data exchange process, so that the resource utilization can be improved, and the power consumption of the terminal device can be reduced. In addition, in this embodiment, the paging message does not carry the downlink data or the scheduling information for the downlink data, so that the paging capacity is not reduced.

In a possible implementation, scheduling information in the DCI may include third indication information, the third indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message. In this way, after receiving the DCI, the first terminal device may determine that there may be the downlink data to arrive, and determine, based on the third indication information in the DCI, a time-frequency location corresponding to the downlink data, to receive the downlink data at the time-frequency location.

In this embodiment of this application, the access network device transmits the second indication information using the DCI, to indicate that there is the downlink data to arrive and indicate the time-frequency location of the downlink data, so that the terminal device can receive the downlink data as early as possible. The downlink data can be transmitted in advance through the simplified signaling or data exchange process, so that the resource utilization can be improved, and the power consumption of the terminal device can be reduced. In addition, in this embodiment, the paging message does not carry the downlink data or the scheduling information for the downlink data, so that the paging capacity is not reduced.

In a possible implementation, the scheduling information in the DCI may include the second indication information and the third indication information. After receiving the DCI, the first terminal device determines, based on the second indication information, that there may be the downlink data to arrive. If the paging message indicates that there is the first downlink data for the first terminal device, the first terminal device determines the time-frequency location of the first downlink data based on the third indication information, and receives the first downlink data at the time-frequency location.

In this embodiment of this application, the access network device transmits the second indication information using the DCI, to indicate that there is the downlink data to arrive and indicate the time-frequency location of the downlink data, so that the terminal device can receive the downlink data as early as possible. The downlink data can be transmitted in advance through the simplified signaling or data exchange process, so that the resource utilization can be improved, and the power consumption of the terminal device can be reduced. In addition, in this embodiment, the paging message does not carry the downlink data or the scheduling information for the downlink data, so that the paging capacity is not reduced.

In a possible implementation, the first terminal device may further receive system information from the access network device, where the system information is used to indicate a time-frequency location occupied by the first downlink data.

For example, the first terminal device receives the system information before receiving the paging message. Alternatively, the first terminal device receives the system information before receiving the DCI.

In this embodiment of this application, because the DCI may carry a limited quantity of bits, the time-frequency location may be indicated by using the system information in this method. This helps reduce information carried in the DCI, to reduce load of the DCI as much as possible.

In a possible implementation, the access network device may further send fourth indication information to the first terminal device by using the system information, where the fourth indication information indicates the data frequency-domain offset and/or the data time-domain offset.

In this embodiment of this application, the access network device includes the fourth indication information in the system information, to indicate that there is the downlink data to arrive and indicate the time-frequency location of the downlink data, so that the terminal device can receive the downlink data as early as possible. The downlink data can be transmitted in advance through the simplified signaling or data exchange process, so that the resource utilization can be improved, and the power consumption of the terminal device can be reduced. In addition, in this embodiment, the paging message does not carry the downlink data or the scheduling information for the downlink data, so that the paging capacity is not reduced.

According to a second aspect, an embodiment of this application provides a data transmission method. The method is applicable to a first terminal device, and includes:

The first terminal device receives DCI from an access network device, where the DCI is used to schedule a first paging message, and is further used to schedule first downlink data for the first terminal device and a second paging message. The first paging message is used to page a terminal device, and the DCI further includes scheduling information for the first downlink data. Then, the first terminal device receives the first paging message and the second paging message from the access network device, where the first paging message does not include an identifier of the first terminal device, but the second paging message includes the identifier of the first terminal device, and the identifier of the first terminal device is used to indicate that the first downlink data corresponds to the first terminal device. The second paging message is used to page the first terminal device, and further indicates that there is the first downlink data corresponding to the first terminal device. Therefore, the first terminal device receives the first downlink data from the access network device based on the DCI and the second paging message.

The method may be performed by a first communication apparatus. The first communication apparatus may be a communication device, or may be a communication apparatus, for example, a chip, that can support the communication device to implement a function required in the method. For example, the first communication apparatus is a terminal device, a chip disposed in the terminal device to implement a function of the terminal device, or another component configured to implement the function of the terminal device. An example in which the first communication apparatus is the terminal device is used in the following description process.

In this embodiment of this application, the first paging message is used to page the terminal device, so that the terminal device initiates a random access process, to establish an RRC connection to the access network device and perform data transmission. The second paging message is used to page the first terminal device, so that the first terminal device directly receives the downlink data after receiving the second paging message. If the downlink data fails to be received, the first terminal device may initiate the random access process. In the method, no complex RRC connection procedure is required between the first terminal device and the access network device. After receiving the DCI and the paging message, the first terminal device may receive the downlink data based on the DCI and the paging message, so that the first terminal device can receive the downlink data as early as possible. The downlink data can be transmitted in advance through a simplified signaling or data exchange process, so that resource utilization can be improved, and power consumption of the terminal device can be reduced. In addition, in this embodiment, the paging message does not carry the downlink data or the scheduling information for the downlink data, so that a paging capacity is not reduced.

In a possible implementation, the second paging message may include an identifier of at least one terminal device, and the identifier of the at least one terminal device one-to-one corresponds to at least one downlink data transport block. Specifically, the second paging message may include a terminal device identifier set, the terminal device identifier set includes the identifier of the at least one terminal device at which the downlink data is to arrive, and the identifier of the at least one terminal device one-to-one corresponds to the at least one downlink data transport block. After receiving the second paging message and when determining that the identifier of the first terminal device is included, the first terminal device determines that there is the first downlink data corresponding to the first terminal device, and therefore receives the downlink data.

In a possible implementation, the scheduling information in the DCI may include second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received. Specifically, the second indication information may indicate, using one bit, that there is the downlink data to be sent to the first terminal device. In this way, after receiving the DCI, the first terminal device may determine that there may be the downlink data to arrive.

In a possible implementation, the scheduling information in the DCI may include third indication information, the third indication information includes a data frequency-domain offset and/or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message. In this way, after receiving the DCI, the first terminal device may determine that there may be the downlink data to arrive, and determine, based on the third indication information in the DCI, a time-frequency location corresponding to the downlink data, to receive the downlink data at the time-frequency location.

In a possible implementation, the scheduling information in the DCI may include the second indication information and the third indication information. After receiving the DCI, the first terminal device determines, based on the second indication information, that there may be the downlink data to arrive. If the second paging message indicates that there is the first downlink data for the first terminal device, the first terminal device determines the time-frequency location of the first downlink data based on the third indication information, and receives the first downlink data at the time-frequency location.

In a possible implementation, the first terminal device may further receive system information from the access network device, where the system information is used to indicate a time-frequency location occupied by the first downlink data.

For example, the first terminal device receives the system information before receiving the second paging message. Alternatively, the first terminal device receives the system information before receiving the DCI.

In a possible implementation, the access network device may further send fourth indication information to the first terminal device by using the system information, where the fourth indication information indicates the data frequency-domain offset and/or the data time-domain offset.

For technical effects brought by the second aspect or the possible implementations, refer to the description of the technical effects brought by the first aspect or the corresponding implementations.

According to a third aspect, an embodiment of this application provides a data transmission method. The method is applicable to an access network device, and includes:

The access network device sends, to a first terminal device, DCI for scheduling a paging message, where the DCI includes scheduling information for downlink data. Next, the access network device sends the paging message to the first terminal device, where the paging message includes first indication information, and the first indication information indicates that first downlink data corresponds to the first terminal device. Then, the access network device sends the first downlink data to the first terminal device.

The method may be performed by a second communication apparatus. The second communication apparatus may be a communication device, or may be a communication apparatus, for example, a chip, that can support the communication device to implement a function required in the method. For example, the second communication apparatus is the access network device, a chip disposed in the access network device to implement a function of the access network device, or another component configured to implement the function of the access network device. An example in which the second communication apparatus is the access network device is used in the following description process.

In a possible implementation, the first indication information includes a quantity N of downlink data transport blocks or a quantity N of identifiers of terminals at which the downlink data is to arrive. After receiving the paging message, the first terminal device determines, based on the quantity N and a terminal list in the paging message, that there is the first downlink data corresponding to the first terminal device, and therefore the first terminal device receives the downlink data.

In a possible implementation, the first indication information includes at least one piece of indication information. The at least one piece of indication information one-to-one corresponds to an identifier of at least one terminal device in the paging message, and indicates whether there is downlink data corresponding to the at least one terminal device. Optionally, the at least one piece of indication information may be at least one field, and each field is used to indicate whether there is downlink data to arrive at the corresponding terminal device. Alternatively, the first indication information may include only a terminal device identifier set, the terminal device identifier set includes an identifier of at least one terminal device, and the identifier of the at least one terminal device one-to-one corresponds to at least one downlink data transport block. After receiving the paging message, the first terminal device determines, based on the first indication information, that there is the first downlink data for the first terminal device. Therefore, the first terminal device receives the downlink data.

In a possible implementation, the scheduling information in the DCI may include second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received. Specifically, the second indication information may indicate, using one bit, that there is the downlink data to be sent to the first terminal device. In this way, after receiving the DCI, the first terminal device may determine that there may be the downlink data to arrive.

In a possible implementation, the scheduling information in the DCI may include third indication information, the third indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message. In this way, after receiving the DCI, the first terminal device may determine that there may be the downlink data to arrive, and determine, based on the third indication information in the DCI, a time-frequency location corresponding to the downlink data, to receive the downlink data at the time-frequency location.

In a possible implementation, the scheduling information in the DCI may include the second indication information and the third indication information. After receiving the DCI, the first terminal device determines, based on the second indication information, that there may be the downlink data to arrive. If the paging message indicates that there is the first downlink data for the first terminal device, the first terminal device determines the time-frequency location of the first downlink data based on the third indication information, and receives the first downlink data at the time-frequency location.

In a possible implementation, the first terminal device may further receive system information from the access network device, where the system information is used to indicate a time-frequency location occupied by the first downlink data.

For example, the first terminal device receives the system information before receiving the paging message. Alternatively, the first terminal device receives the system information before receiving the DCI.

In a possible implementation, the access network device may further send fourth indication information to the first terminal device by using the system information, where the fourth indication information indicates the data frequency-domain offset and/or the data time-domain offset.

For technical effects brought by the third aspect or the possible implementations, refer to the description of the technical effects brought by the first aspect or the corresponding implementations.

According to a fourth aspect, an embodiment of this application provides a data transmission method. The method is applicable to an access network device, and includes:

The access network device sends, to a first terminal device, DCI for scheduling a first paging message, where the DCI is used to schedule the first paging message, and is further used to schedule first downlink data for the first terminal device and a second paging message. Next, the access network device sends the second paging message to the first terminal device, where the second paging message includes an identifier of the first terminal device, and the identifier of the first terminal device is used to indicate that the first downlink data corresponds to the first terminal device. Then, the access network device sends the first downlink data to the first terminal device.

The method may be performed by a second communication apparatus. The second communication apparatus may be a communication device, or may be a communication apparatus, for example, a chip, that can support the communication device to implement a function required in the method. For example, the second communication apparatus is the access network device, a chip disposed in the access network device to implement a function of the access network device, or another component configured to implement the function of the access network device. An example in which the second communication apparatus is the access network device is used in the following description process.

In a possible implementation, the first indication information includes a quantity N of downlink data transport blocks or a quantity N of identifiers of terminals at which downlink data is to arrive. After receiving the paging message, the first terminal device determines, based on the quantity N and a terminal list in the paging message, that there is the first downlink data corresponding to the first terminal device, and therefore the first terminal device receives the downlink data.

In a possible implementation, the second paging message may include an identifier of at least one terminal device, and the identifier of the at least one terminal device one-to-one corresponds to at least one downlink data transport block. Specifically, the second paging message may include a terminal device identifier set, the terminal device identifier set includes the identifier of the at least one terminal device, and the identifier of the at least one terminal device one-to-one corresponds to the at least one downlink data transport block. After receiving the paging message and when determining that the identifier of the first terminal device is included, the first terminal device determines that there is the first downlink data corresponding to the first terminal device, and therefore receives the downlink data.

In a possible implementation, scheduling information in the DCI may include second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received. Specifically, the second indication information may indicate, using one bit, that there is the downlink data to be sent to the first terminal device. In this way, after receiving the DCI, the first terminal device may determine that there may be the downlink data to arrive.

In a possible implementation, scheduling information in the DCI may include third indication information, the third indication information includes a data frequency-domain offset and/or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message. In this way, after receiving the DCI, the first terminal device may determine that there may be the downlink data to arrive, and determine, based on the third indication information in the DCI, a time-frequency location corresponding to the downlink data, to receive the downlink data at the time-frequency location.

In a possible implementation, the scheduling information in the DCI may include the second indication information and the third indication information. After receiving the DCI, the first terminal device determines, based on the second indication information, that there may be the downlink data to arrive. If the paging message indicates that there is the first downlink data for the first terminal device, the first terminal device determines the time-frequency location of the first downlink data based on the third indication information, and receives the first downlink data at the time-frequency location.

In a possible implementation, the first terminal device may further receive system information from the access network device, where the system information is used to indicate a time-frequency location occupied by the first downlink data.

For example, the first terminal device receives the system information before receiving the paging message. Alternatively, the first terminal device receives the system information before receiving the DCI.

In a possible implementation, the access network device may further send fourth indication information to the first terminal device by using the system information, where the fourth indication information indicates the data frequency-domain offset and/or the data time-domain offset.

For technical effects brought by the fourth aspect or the possible implementations, refer to the description of the technical effects brought by the third aspect or the corresponding implementations.

According to a fifth aspect, an embodiment of this application provides a communication apparatus. The apparatus may be a terminal device, may be an apparatus in the terminal device, or may be an apparatus that can be collaboratively used with the terminal device. In a design, the apparatus may include modules that are in a one-to-one correspondence with the methods/operations/steps/actions described in the first aspect or the second aspect. The modules may be hardware circuits or software, or may be implemented by a combination of the hardware circuits and the software. For example, the apparatus may include a transceiver module and a processing module, and the transceiver module and the processing module may perform a corresponding function in any design example of the first aspect or a corresponding function in any design example of the second aspect. For functions of the transceiver module and the processing module, refer to the description in the first aspect and the second aspect. Details are not described herein again.

According to a sixth aspect, a communication apparatus is provided. The apparatus may be an access network device, an apparatus in the access network device, or an apparatus that can be collaboratively used with a network device. In a design, the apparatus may include modules that are in a one-to-one correspondence with the methods/operations/steps/actions described in the third aspect or the fourth aspect. The modules may be hardware circuits or software, or may be implemented by a combination of the hardware circuits and the software. For example, the apparatus may include a transceiver module, and the transceiver module is configured to perform a corresponding function in any design example of the third aspect or a corresponding function in any design example of the fourth aspect. For specific functions of a processing module and the transceiver module, refer to the description in the third aspect and the fourth aspect. Details are not described herein again.

According to a seventh aspect, an embodiment of this application provides an apparatus. The apparatus includes a processor, configured to implement the method described in the first aspect, or configured to implement the method described in the second aspect. The apparatus may further include a memory, configured to store instructions and/or data. The memory and the processor may be coupled and integrated into one chip, or may be separately integrated into different chips. When executing the program instructions stored in the memory, the processor may implement the method described in the first aspect, or may implement the method described in the second aspect. The apparatus may further include a communication interface. The communication interface is used by the apparatus to communicate with another device. For example, the communication interface may be a transceiver, a circuit, a bus, a module, a pin, or another type of communication interface. The another device may be a network device or the like.

In a possible device, the apparatus includes: the memory, configured to store the program instructions; the communication interface, configured to communicate with another apparatus; and the processor, configured to: receive downlink control information DCI from an access network device through the communication interface, where the DCI is used to schedule a paging message, and further includes scheduling information for downlink data; receive the paging message from the access network device through the communication interface, where the paging message includes first indication information, and the first indication information indicates that first downlink data corresponds to the first terminal device; and receive the first downlink data from the access network device through the communication interface.

In a possible implementation, the first indication information includes a quantity N of downlink data transport blocks or a quantity N of identifiers of terminals at which the downlink data is to arrive. After receiving the paging message, the first terminal device determines, based on the quantity N and a terminal list in the paging message, that there is the first downlink data corresponding to the first terminal device, and therefore the first terminal device receives the downlink data.

In a possible implementation, the first indication information includes at least one piece of indication information. The at least one piece of indication information one-to-one corresponds to an identifier of at least one terminal device in the paging message, and indicates whether there is downlink data corresponding to the at least one terminal device. Optionally, the at least one piece of indication information may be at least one field, and each field is used to indicate whether there is downlink data to arrive at the corresponding terminal device. Alternatively, the first indication information may include only a terminal device identifier set, the terminal device identifier set includes an identifier of at least one terminal device, and the identifier of the at least one terminal device one-to-one corresponds to at least one downlink data transport block. After receiving the paging message and when determining that an identifier of the first terminal device is included, the first terminal device determines that there is the first downlink data corresponding to the first terminal device, and therefore receives the downlink data.

In a possible implementation, the scheduling information in the DCI may include second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received. Specifically, the second indication information may indicate, using one bit, that there is the downlink data to be sent to the first terminal device. In this way, after receiving the DCI, the first terminal device may determine that there may be the downlink data to arrive.

In a possible implementation, the scheduling information in the DCI may include third indication information, the third indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message. In this way, after receiving the DCI, the first terminal device may determine that there may be the downlink data to arrive, and determine, based on the third indication information in the DCI, a time-frequency location corresponding to the downlink data, to receive the downlink data at the time-frequency location.

In a possible implementation, the scheduling information in the DCI may include the second indication information and the third indication information. After receiving the DCI, the first terminal device determines, based on the second indication information, that there may be the downlink data to arrive. If the paging message indicates that there is the first downlink data for the first terminal device, the first terminal device determines the time-frequency location of the first downlink data based on the third indication information, and receives the first downlink data at the time-frequency location.

In a possible implementation, the first terminal device may further receive system information from the access network device, where the system information is used to indicate a time-frequency location occupied by the first downlink data.

For example, the first terminal device receives the system information before receiving the paging message. Alternatively, the first terminal device receives the system information before receiving the DCI.

In a possible implementation, the access network device may further send fourth indication information to the first terminal device by using the system information, where the fourth indication information indicates the data frequency-domain offset and/or the data time-domain offset.

For functions and beneficial effects of the processor and the communication interface, refer to the description in the first aspect. Details are not described herein again.

In another possible device, the apparatus includes: the memory, configured to store the program instructions; the communication interface, configured to communicate with another apparatus; and the processor, configured to: receive downlink control information DCI from an access network device, where the DCI is used to schedule a first paging message, and is further used to schedule first downlink data for the first terminal device and a second paging message; receive the second paging message from the access network device, where the second paging message includes an identifier of the first terminal device, and the identifier of the first terminal device is used to indicate that the first downlink data corresponds to the first terminal device; and receive the first downlink data from the access network device.

For functions and beneficial effects of the processor and the communication interface, refer to the description in the second aspect. Details are not described herein again.

According to an eighth aspect, an embodiment of this application provides an apparatus. The apparatus includes a processor, configured to implement the method described in the third aspect, or configured to implement the method described in the fourth aspect. The apparatus may further include a memory, configured to store instructions and/or data. The memory and the processor may be coupled and integrated into one chip, or may be separately integrated into different chips. When executing the program instructions stored in the memory, the processor may implement the method described in the third aspect, or may implement the method described in the fourth aspect. The apparatus may further include a communication interface. The communication interface is used by the apparatus to communicate with another device. For example, the communication interface may be a transceiver, a circuit, a bus, a module, a pin, or another type of communication interface. The another device may be a network device or the like.

In a possible device, the apparatus includes: the memory, configured to store the program instructions; the communication interface, configured to communicate with another apparatus; and the processor, configured to: send, to a first terminal device through the communication interface, downlink control information DCI for scheduling a paging message, where the DCI includes scheduling information for downlink data; send the paging message to the first terminal device through the communication interface, where the paging message includes first indication information, and the first indication information indicates that first downlink data corresponds to the first terminal device; and finally send the first downlink data to the first terminal device through the communication interface.

For functions and beneficial effects of the processor and the communication interface, refer to the description in the third aspect. Details are not described herein again.

In another possible device, the apparatus includes: the memory, configured to store the program instructions; the communication interface, configured to communicate with another apparatus; and the processor, configured to: send, to a first terminal device, downlink control information DCI for scheduling a first paging message, where the DCI is used to schedule the first paging message, and is further used to schedule first downlink data for the first terminal device and a second paging message; send the second paging message to the first terminal device, where the second paging message includes an identifier of the first terminal device, and the identifier of the first terminal device is used to indicate that the first downlink data corresponds to the first terminal device; and send the first downlink data to the first terminal device.

For functions and beneficial effects of the processor and the communication interface, refer to the description in the fourth aspect. Details are not described herein again.

According to a ninth aspect, an embodiment of this application provides a first communication apparatus. The first communication apparatus is configured to perform the method according to any one of the first aspect or the possible implementations of the first aspect. Specifically, the first communication apparatus may include modules configured to perform the method according to any one of the first aspect or the possible implementations of the first aspect, for example, include a processing module and a transceiver module. For example, the transceiver module may include a sending module and a receiving module. The sending module and the receiving module may be different functional modules, or may be a same functional module but can implement different functions. For example, the first communication apparatus is a first terminal device, or is a chip or another component disposed in the first terminal device. For example, the communication device is the first terminal device. The following uses an example in which the first communication apparatus is the first terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the first communication apparatus is the first terminal device, the transceiver is implemented, for example, by using an antenna, a feeder, and a codec in the first terminal device. Alternatively, if the first communication apparatus is the chip disposed in the first terminal device, the transceiver (or the transmitter and the receiver) is, for example, a communication interface in the chip. The communication interface is connected to a radio frequency transceiver component in the first terminal device, to send and receive information through the radio frequency transceiver component. In a description process of the fifth aspect, description is provided still by using an example in which the first communication apparatus is the first terminal device and includes the processing module and the transceiver module.

The transceiver module is configured to receive downlink control information DCI from an access network device, where the DCI is used to schedule a paging message, and is further used to schedule downlink data.

The transceiver module is further configured to receive the paging message from the access network device, where the paging message includes first indication information, and the first indication information indicates that there is first downlink data corresponding to the first terminal device.

The processing module is configured to determine whether there is the downlink data and determine a receiving location of the downlink data, based on the DCI and the paging message.

The transceiver module is further configured to receive the first downlink data from the access network device.

In an optional implementation, the DCI includes third indication information, the third indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

In an optional implementation, the transceiver module is further configured to receive system information from the access network device, where the system information is used to indicate a time-frequency location of the first downlink data.

In an optional implementation, the system information includes fourth indication information, the fourth indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

In an optional implementation, the first indication information includes a quantity N of downlink data transport blocks.

In an optional implementation, the first indication information includes at least one piece of indication information. The at least one piece of indication information one-to-one corresponds to an identifier of at least one terminal device in the paging message, and indicates whether there is downlink data corresponding to the at least one terminal device. Optionally, the at least one piece of indication information may be at least one field, and each field is used to indicate whether there is downlink data to arrive at the corresponding terminal device. Alternatively, the first indication information may include only a terminal device identifier set, the terminal device identifier set includes an identifier of at least one terminal device, and the identifier of the at least one terminal device one-to-one corresponds to at least one downlink data transport block.

For technical effects brought by the ninth aspect or the optional implementations, refer to the description of the technical effects brought by the first aspect or the corresponding implementations.

According to a tenth aspect, a first communication apparatus is provided. The first communication apparatus is configured to perform the method according to any one of the second aspect or the possible implementations of the second aspect. Specifically, the first communication apparatus may include modules configured to perform the method according to any one of the second aspect or the possible implementations of the second aspect, for example, include a processing module and a transceiver module. For example, the transceiver module may include a sending module and a receiving module. The sending module and the receiving module may be different functional modules, or may be a same functional module but can implement different functions. For example, the first communication apparatus is a first terminal device, or is a chip or another component disposed in the communication device. The following uses an example in which the first communication apparatus is a network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the first communication apparatus is the first terminal device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the sixth aspect, description is provided still by using an example in which the first communication apparatus is the first terminal device and includes the processing module and the transceiver module.

The receiving module is configured to receive DCI from an access network device, where the DCI is used to schedule a first paging message, and is further used to schedule first downlink data for the first terminal device and a second paging message.

The receiving module is further configured to receive the first paging message and the second paging message from the access network device, where the first paging message does not include an identifier of the first terminal device, but the second paging message includes the identifier of the first terminal device, and the identifier of the first terminal device is used to indicate that the first downlink data corresponds to the first terminal device.

The processing module is configured to determine whether there is the downlink data and determine a receiving location of the downlink data, based on the first paging message and the second paging message.

The receiving module is further configured to receive the first downlink data from the access network device.

In an optional implementation, the scheduling information includes second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received.

In an optional implementation, the DCI includes third indication information, the third indication information includes a data frequency-domain offset and/or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

In an optional implementation, the receiving module is further configured to receive system information from the access network device, where the system information is used to indicate a time-frequency location of the first downlink data or the second paging message.

In an optional implementation, the system information includes fourth indication information, the fourth indication information includes a data frequency-domain offset and/or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

In an optional implementation, the second paging message includes an identifier of at least one terminal device, and the identifier of the at least one terminal device one-to-one corresponds to at least one downlink data transport block. Specifically, the second paging message may include a terminal device identifier set, the terminal device identifier set includes the identifier of the at least one terminal device, and the identifier of the at least one terminal device one-to-one corresponds to the at least one downlink data transport block.

For technical effects brought by the tenth aspect or the optional implementations, refer to the description of the technical effects brought by the second aspect or the corresponding implementations.

According to an eleventh aspect, a second communication apparatus is provided. The second communication apparatus is configured to perform the method according to any one of the third aspect or the possible implementations of the third aspect. Specifically, the second communication apparatus may include modules configured to perform the method according to any one of the third aspect or the possible implementations of the third aspect, for example, include a processing module and a transceiver module. For example, the transceiver module may include a sending module and a receiving module. The sending module and the receiving module may be different functional modules, or may be a same functional module but can implement different functions. For example, the communication device is an access network device. The following uses an example in which the second communication apparatus is the access network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the second communication apparatus is the access network device, the transceiver is implemented, for example, by using an antenna, a feeder, and a codec in the access network device. Alternatively, if the second communication apparatus is a chip disposed in the access network device, the transceiver (or the transmitter and the receiver) is, for example, a communication interface in the chip. The communication interface is connected to a radio frequency transceiver component in the access network device, to send and receive information through the radio frequency transceiver component. In a description process of the sixth aspect, description is provided still by using an example in which the second communication apparatus is the access network device and includes the processing module and the transceiver module.

The processing module is configured to determine downlink control information DCI for scheduling a paging message.

The transceiver module is configured to send, to a first terminal device, the downlink control information DCI for scheduling the paging message, where the DCI is further used to schedule downlink data.

The transceiver module is further configured to send the paging message to the first terminal device, where the paging message includes first indication information, and the first indication information indicates that first downlink data corresponds to the first terminal device.

The transceiver module is configured to send the first downlink data to the first terminal device.

In an optional implementation, the DCI includes second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received.

In an optional implementation, the DCI includes third indication information, the third indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

In an optional implementation, before sending the first downlink data to the first terminal device, the transceiver module is further configured to send system information to the first terminal device, where the system information is used to indicate a time-frequency location occupied by the first downlink data.

In an optional implementation, the system information includes fourth indication information, the fourth indication information includes a data frequency-domain offset and/or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

In an optional implementation, the first indication information includes a quantity N of downlink data transport blocks.

In an optional implementation, the first indication information includes at least one piece of indication information. The at least one piece of indication information one-to-one corresponds to an identifier of at least one terminal device in the paging message, and indicates whether there is downlink data corresponding to the at least one terminal device. Optionally, the at least one piece of indication information may be at least one field, and each field is used to indicate whether there is downlink data to arrive at the corresponding terminal device. Alternatively, the first indication information may include only a terminal device identifier set, the terminal device identifier set includes an identifier of at least one terminal device, and the identifier of the at least one terminal device one-to-one corresponds to at least one downlink data transport block.

For technical effects brought by the eleventh aspect or the optional implementations, refer to the description of the technical effects brought by the third aspect or the corresponding implementations.

According to a twelfth aspect, a second communication apparatus is provided. The second communication apparatus is configured to perform the method according to any one of the fourth aspect or the possible implementations of the fourth aspect. Specifically, the second communication apparatus may include modules configured to perform the method according to any one of the fourth aspect or the possible implementations of the fourth aspect, for example, include a processing module and a transceiver module. For example, the transceiver module may include a sending module and a receiving module. The sending module and the receiving module may be different functional modules, or may be a same functional module but can implement different functions. For example, the communication device is an access network device. The following uses an example in which the second communication apparatus is the access network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module but can implement different functions. If the second communication apparatus is the access network device, the transceiver is implemented, for example, by using an antenna, a feeder, and a codec in the access network device. Alternatively, if the second communication apparatus is a chip disposed in the access network device, the transceiver (or the transmitter and the receiver) is, for example, a communication interface in the chip. The communication interface is connected to a radio frequency transceiver component in the access network device, to send and receive information through the radio frequency transceiver component. In a description process of the sixth aspect, description is provided still by using an example in which the second communication apparatus is the access network device and includes the processing module and the transceiver module.

The processing module is configured to determine downlink control information DCI for scheduling a first paging message.

The transceiver module is configured to send, to a first terminal device, the downlink control information DCI for scheduling the first paging message, where the DCI includes scheduling information for downlink data.

The transceiver module is further configured to: send a second paging message to the first terminal device, where the second paging message includes an identifier of the terminal device, and the identifier of the terminal device is used to indicate that first downlink data corresponds to the terminal device; and send the first downlink data to the first terminal device.

In an optional implementation, the scheduling information includes second indication information, and the second indication information indicates that there is the first downlink data to be sent to the first terminal device. The second indication information indicates that a network device is to subsequently send the first downlink data to the first terminal device, so that the terminal device may learn that the first downlink data needs to be received.

In an optional implementation, the DCI includes third indication information, the third indication information includes a data frequency-domain offset and/or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

In an optional implementation, the transceiver module is further configured to send system information to the first terminal device, where the system information is used to indicate a time-frequency location occupied by the downlink data.

In an optional implementation, the system information includes fourth indication information, the fourth indication information includes a data frequency-domain offset and/or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

In an optional implementation, the second paging message includes an identifier of at least one terminal device, and the identifier of the at least one terminal device one-to-one corresponds to at least one downlink data transport block. Specifically, the second paging message may include a terminal device identifier set, the terminal device identifier set includes the identifier of the at least one terminal device, and the identifier of the at least one terminal device one-to-one corresponds to the at least one downlink data transport block.

In an optional implementation, the first paging message is used to page the terminal device.

For technical effects brought by the twelfth aspect or the optional implementations, refer to the description of the technical effects brought by the fourth aspect or the corresponding implementations.

According to a thirteenth aspect, an embodiment of this application further provides a chip system. The chip system includes a processor and an interface, may further include a memory, and is configured to implement the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect. The chip system may include a chip, or include a chip and another discrete component.

According to a fourteenth aspect, an embodiment of this application further provides a computer program product, including instructions. When the instructions are run on a computer, the computer is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

According to a fifteenth aspect, an embodiment of this application provides a system. The system includes the apparatus according to the fifth aspect or the sixth aspect and the apparatus according to the seventh aspect or the eighth aspect. Alternatively, the system includes the apparatus according to the ninth aspect or the tenth aspect and the apparatus according to the eleventh aspect or the twelfth aspect.

According to a sixteenth aspect, an embodiment of this application provides a computer storage medium, configured to store a computer program. The computer program includes instructions for performing the method according to any one of the first aspect, the second aspect, the possible designs of the first aspect, or the possible designs of the second aspect.

According to a seventeenth aspect, an embodiment of this application provides a computer storage medium, configured to store a computer program. The computer program includes instructions for performing the method according to any one of the third aspect, the fourth aspect, the possible designs of the third aspect, or the possible designs of the fourth aspect.

DETAILED DESCRIPTION OF ILLUSTRATIVE EMBODIMENTS

Figure 1:
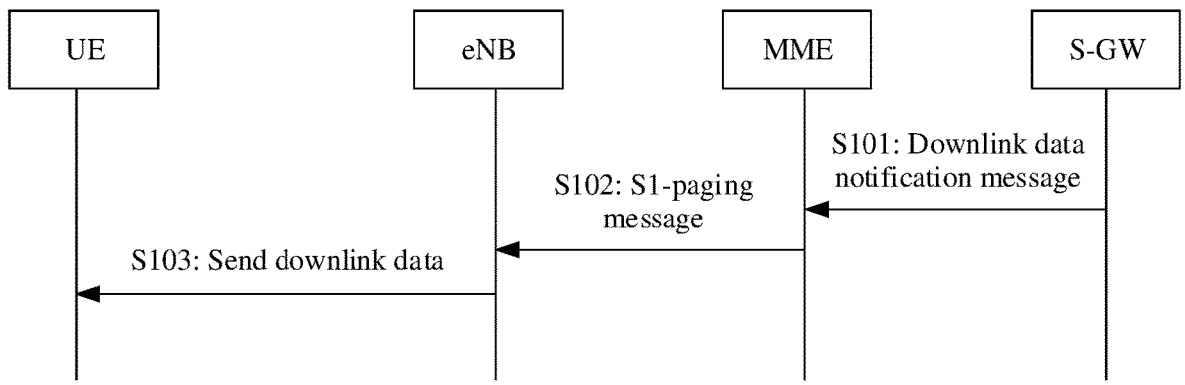
FIG. 1 is a flowchart of an example of an early data transmission technology in a conventional technology.

To make objectives, technical solutions, and advantages of embodiments of this application clearer, the following further describes embodiments of this application in detail with reference to accompanying drawings.

Some terms in embodiments of this application are explained below to help persons skilled in the art have a better understanding.

(1) A terminal device is also referred to as a terminal, user equipment (UE), a mobile station (MS), a mobile terminal (MT), or the like, and is a device that provides voice and/or data connectivity for a user. For example, the terminal device may include a handheld device with a wireless connection function or a processing device connected to a wireless modem.

The terminal may communicate with a core network through a radio access network (RAN), and exchange a voice and/or data with the RAN. The terminal may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like.

For example, the terminal may include a mobile phone (or referred to as a "cellular" phone), a computer with a mobile terminal, a portable, pocket-sized, handheld, computer built-in, or in-vehicle mobile apparatus, or an intelligent wearable device. For example, the terminal is a personal communications service (PCS) phone, a cordless telephone set, a session initiation protocol (SIP) phone, a wireless local loop (WLL) station, or a personal digital assistant (PDA).

Alternatively, the terminal device may further include a limited device, for example, a device with low power consumption, a device with a limited storage capability, or a device with a limited computing capability. For example, the terminal device includes information sensing devices such as a barcode, radio frequency identification (RFID), a sensor, a global positioning system (GPS), or a laser scanner.

By way of example and not limitation, in embodiments of this application, the intelligent wearable device is a general term of wearable devices such as glasses, gloves, watches, clothes, and shoes that are developed by applying wearable technologies to intelligent designs of daily wear. The intelligent wearable device is a portable device that is directly worn on the body or integrated into clothes or an accessory of a user.

The intelligent wearable device is not only a hardware device, but also implements a powerful function through software support, data exchange, and cloud interaction. Generalized intelligent wearable devices include full-featured and large-sized devices that can implement complete or partial functions without depending on smartphones, for example, smart watches or smart glasses, and devices that focus on only one type of application function and need to work with other devices such as smartphones, for example, various smart bands, smart helmets, or smart jewelry for monitoring physical signs.

Alternatively, the terminal may be a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

(2) A radio access network (RAN) device, for example, including a base station (for example, an access point), may be a device that is in an access network and that communicates with a wireless terminal over an air interface through one or more cells. The radio access network device may be configured to perform mutual conversion between a received over-the-air frame and an Internet protocol (IP) packet, and serve as a router between a terminal device and a remaining portion of the access network, and the remaining portion of the access network may include an IP network. The radio access network device may further coordinate attribute management of the air interface.

For example, the (radio) access network device may include a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP).

The (radio) access network device may alternatively include an evolved NodeB (eNB, or e-NodeB, evolved NodeB) in a long term evolution (long term evolution, LTE) system, an LTE-Advanced (LTE-A) system, or a 4th generation mobile communication technology (4th generation mobile communication technology, 4G) system.

Alternatively, the (radio) access network device may include a next generation NodeB (gNB), a transmission reception point (TRP), or a transmission point (TP) in a 5G system or a new radio (NR) system.

Alternatively, the (radio) access network device may include a centralized unit (CU) and/or a distributed unit (DU) in a cloud radio access network (CloudRAN) system. This is not limited in embodiments of this application. In embodiments of this application, technical terms "(radio) access network device" and "access network device" may be used interchangeably.

(3) A core network (CN) device is connected to a plurality of access networks, and includes a circuit switched (CS) domain and/or a packet switched (PS) domain. CS network elements include a mobile switching center, a visited location register, and a gateway mobile switching center, and PS network elements include a general packet radio service (GPRS) node and a gateway GPRS support node. Some network elements such as a home location register, the visited location register, and an authentication center may be shared by the CS domain and the PS domain.

(4) "A plurality of" in embodiments of this application means two or more than two. In view of this, "a plurality of" in embodiments of this application may also be understood as "at least two". "At least one" may be understood as one or more, for example, one, two, or more.

For example, "include at least one" means "include one, two, or more", and there is no limitation on which is included. For example, "include at least one of A, B, and C" may mean "include A, B, or C", "include A and B, A and C, or B and C", or "include A, B, and C".

The term "and/or" describes an association relationship between associated objects and indicates that three relationships may exist. For example, A and/or B may indicate the following three cases: Only A exists, both A and B exist, and only B exists.

In addition, the character "/" generally indicates an "or" relationship between associated objects unless otherwise specified. Terms "system" and "network" may be used interchangeably in embodiments of this application.

Unless otherwise specified, ordinal numbers such as "first" and "second" in embodiments of this application are used to distinguish between a plurality of objects, and are not intended to limit a sequence, a time sequence, priorities, or importance of the plurality of objects.

The foregoing describes some concepts in embodiments of this application. The following describes technical features in embodiments of this application.

An MTC network or an NB-IoT network is a component of next generation communication systems such as a 5G system, and has rapidly increasing market requirements. The MTC network or the NB-IoT network has more connected terminal devices than a conventional cellular network. For example, for Internet of things terminal devices deployed on a large scale, such as smart water/electricity meters, smart households, vehicles, or wearable devices, one NB-IoT base station may serve a large quantity (for example, more than tens of thousands) of terminal devices of the foregoing types. In addition, a service volume of the terminal device is large, and a data packet generated for a service is smaller.

In the conventional cellular network, when a terminal device communicates with an access network device, radio resource control (RRC) connection needs to be established. However, a process of establishing the RRC connection requires exchange of a plurality of pieces of signaling between the terminal device and a network device. Therefore, to reduce signaling overheads and power consumption in the MTC network or the NB-IoT network, a paging message-based downlink data transmission method is provided. In this way, a small data packet can be transmitted without the RRC connection established between the terminal device and the access network device.

FIG. 1 is a flowchart of an example of a paging message-based downlink data transmission method in a conventional technology.

Step 101: A serving gateway (S-GW) sends a downlink data notification message to a mobility management entity (MME).

Step 102: The MME sends an S1-paging message to an eNB based on the downlink data notification message.

The MME sends the paging message to the eNB through an S1 interface, where the paging message includes a temporary mobile subscriber identity (system architecture evolution temporary mobile subscriber identity, S-TMSI) of UE to be paged.

In a possible implementation, based on step 101 and step 102, the method may further include: The S-GW sends downlink data to the eNB.

In another possible implementation, based on step 101 and step 102, the method may further include: The S-GW sends downlink data to the MME, and then the MME sends the downlink data to the eNB.

Step 103: The eNB sends the downlink data to the UE.

In a possible implementation (denoted as a method 1), step 103 is specifically: The eNB sends a Uu-paging message to the UE, where the Uu-paging message carries the downlink data. The UE receives the downlink data by receiving the Uu-paging message.

In another possible implementation (denoted as a method 2), step 103 is specifically: The eNB sends a Uu-paging message to the UE, where the Uu-paging message carries scheduling information for the downlink data, and the scheduling information is used to schedule the downlink data. The UE receives the scheduling information for the downlink data by receiving the Uu-paging message, and then receives the downlink data based on the scheduling information.

In another possible implementation (denoted as a method 3), step 103 is specifically: The eNB sends a Uu-paging message to the UE, where the Uu-paging message carries a cell radio network temporary identifier (cell radio network temporary identifier, C-RNTI), the C-RNTI is used to send scheduling information for the downlink data, and the scheduling information is used to schedule the downlink data. The UE receives the C-RNTI by receiving the Uu-paging message, receives the scheduling information for the downlink data by using the C-RNTI, and receives the downlink data based on the scheduling information.

It may be learned that, in the foregoing procedure, the paging message sent by the eNB to the UE may carry the downlink data, may carry the scheduling information for the downlink data, or may carry the C-RNTI. Because a size of the paging message is limited, and the downlink data, the scheduling information, and the C-RNTI occupy a large quantity of bits, a quantity of bits in the paging message that carry a UE identifier is reduced, and a paging capacity of the paging message is affected.

In view of this, embodiments of this application provide a data transmission method. According to the method, downlink data can be transmitted in advance through a simplified signaling or data exchange process, so that resource utilization can be improved, and power consumption of a terminal can be reduced. In addition, a paging message does not carry the downlink data or scheduling information for the downlink data, so that load of the paging message is not increased, and a paging capacity is not reduced.

It should be noted that, "time-domain location", "time-frequency location", and "frequency-domain location" in the communication method provided in embodiments of this application may be respectively "time-domain location of a time-frequency resource", "time-frequency location of a time-frequency resource", and "frequency-domain location of a time-frequency resource". It may be understood that a specific time-frequency location indication method is not limited in embodiments of this application. For example, "time-domain location of downlink data" may be "time-domain location of a time-frequency resource of the downlink data". After determining the time-domain location of the downlink data, the terminal device may learn of a time-domain location of a transmission resource of the downlink data, and may receive the downlink data at the time-domain location. For example, if the downlink data is carried on a physical downlink channel, the terminal device may determine a time-domain location of the physical downlink channel, receive the physical downlink channel, and obtain the downlink data.

The method and an apparatus are based on a same inventive concept. Because the method and the apparatus have a similar problem-resolving principle, for implementations of the apparatus and the method, refer to each other, and no repeated description is provided. In description of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between associated objects. In this application, "at least one" means one or more, and "a plurality of" means two or more. In addition, it should be understood that in embodiments of this application, both a core network device and an access network device may be referred to as network devices. In description of this application, for ease of description, terms such as "first" and "second" may be used for differentiation in description in embodiments of this application. It may be understood that such terms cannot be understood as an indication or implication of relative importance, and cannot be understood as an indication or implication of a sequence.

The technical solutions in embodiments of this application may be applied to various communication systems such as a long term evolution (LTE) system, a worldwide interoperability for microwave access (WiMAX) communication system, 5th generation (5G) communication systems such as a new radio access technology (new radio access technology, NR) system, and future communication systems such as a 6G system. Specifically, for example, the technical solutions may be applied to an MTC communication scenario, an NB-IoT communication scenario, or any scenario of transmission of downlink small data packets.

The following describes embodiments of this application in detail with reference to the accompanying drawings.

Figure 2A:
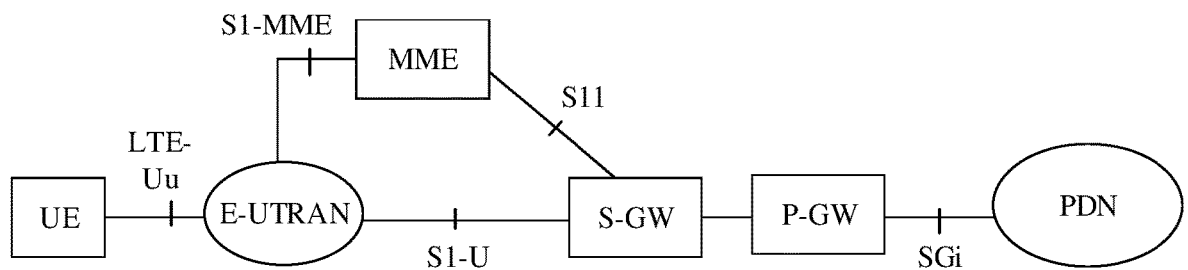
FIG. 2A is a schematic diagram of a specific communication system architecture to which an embodiment of this application is applicable.

FIG. 2A is a schematic diagram of a possible communication system architecture to which a data transmission method according to an embodiment of this application is applicable. The communication system architecture shown in FIG. 2A includes two parts: a radio access network and a core network. The radio access network is an evolved universal terrestrial radio access network (E-UTRAN), and is configured to implement functions related to radio access. The core network includes an MME, an S-GW, a packet data network gateway (P-GW), and the like. The MME is mainly responsible for mobility management and session management on a control plane. The S-GW is a user plane function entity, and routes and forwards packet data. The P-GW is a gateway connected to an external data network. In actual network deployment, the S-GW and the P-GW may alternatively be integrally deployed, and may be collectively referred to as a gateway. UE may access an external packet data network (PDN) by establishing a connection from the UE sequentially to the E-UTRAN, the S-GW, the P-GW, and then the PDN.

Figure 2B:
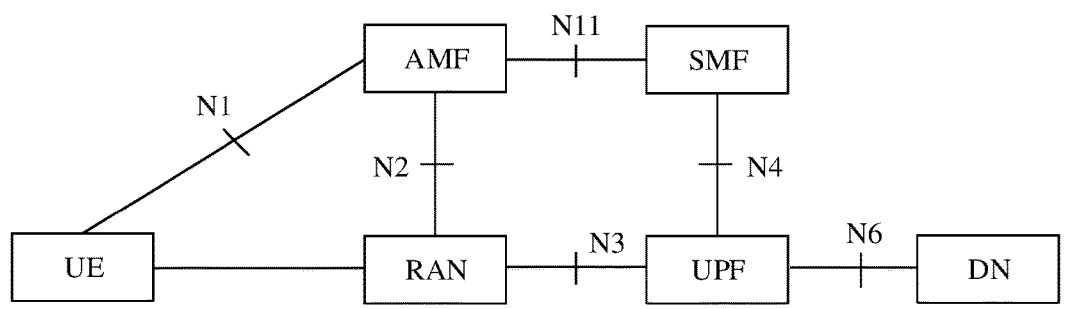
FIG. 2B is a schematic diagram of another specific communication system architecture to which an embodiment of this application is applicable.

FIG. 2B is a schematic diagram of another possible communication system architecture to which an embodiment of this application is applicable. The communication system architecture shown in FIG. 2B is also divided into two parts: a radio access network and a core network. The radio access network is a next generation radio access network (next generation radio access network, NG-RAN), and is configured to implement functions related to radio access. The core network includes an access and mobility management function (AMF) network element, a session management function (SMF) network element, a user plane function (UPF) network element, and the like. The AMF network element is mainly responsible for mobility management. The AMF network element may also be referred to as an AMF device or an AMF entity. The SMF network element is mainly responsible for session management. The SMF network element may also be referred to as an SMF device or an SMF entity. The UPF is mainly responsible for processing, for example, forwarding, a packet of a user. UE may access a data network (DN) by establishing a session from the UE sequentially to the NG-RAN, the UPF, and then the DN.

It should be understood that, the communication system architectures provided in embodiments of this application are merely examples, and may be used in the 5G system, the long term evolution-advanced (long term evolution-advanced, LTE-A) system, the worldwide interoperability for microwave access (worldwide interoperability for microwave access, WiMAX) system, a wireless local area network (wireless local area network, WLAN) system, or the like.

In addition, the communication system architectures may be further used in a future-oriented communication technology. The communication system architectures described in embodiments of this application are intended to describe the technical solutions in embodiments of this application more clearly, and constitute no limitation on the technical solutions provided in embodiments of this application. Persons of ordinary skill in the art may learn that, with evolution of network architectures, the technical solutions provided in embodiments of this application are also applicable to similar technical problems.

With reference to the accompanying drawings, the following describes the technical solutions provided in embodiments of this application.

It should be noted that, when the data transmission method provided in embodiments of this application is applied to the communication system shown in FIG. 2A, an access network device described below may be an access network device in the communication system architecture shown in FIG. 2A, for example, may be an eNB, a terminal device described below may be a terminal device in the communication system architecture shown in FIG. 2A, and a core network device described below may be a core network device in the communication system architecture shown in FIG. 2A, for example, may be the MME network element. When the method is applied to the communication system shown in FIG. 2B, an access network device described below may be an access network device in the communication system architecture shown in FIG. 2B, for example, may be a gNB, a terminal device described below may be a terminal device in the communication system architecture shown in FIG. 2B, and a core network device described below may be a core network device in the communication system architecture shown in FIG. 2B, for example, may be the AMF network element.

For ease of description, an example in which the method is applied to the communication system architecture shown in FIG. 2B is used.

In the following description, interactive devices may be represented by the terminal device, the access network device, the core network device, and the like. For example, the terminal device may be UE, the access network device may be the gNB, and the core network device may be the AMF or the UPF.

Embodiment 1

This embodiment of this application provides a data transmission method. The method may also be referred to as a paging DCI-based downlink data transmission method, a method for transmitting downlink data immediately after a paging message, a paging-based downlink data transmission method, or a paging-based early transmission method for downlink data. This is not limited in this embodiment of this application.

Figure 3A:
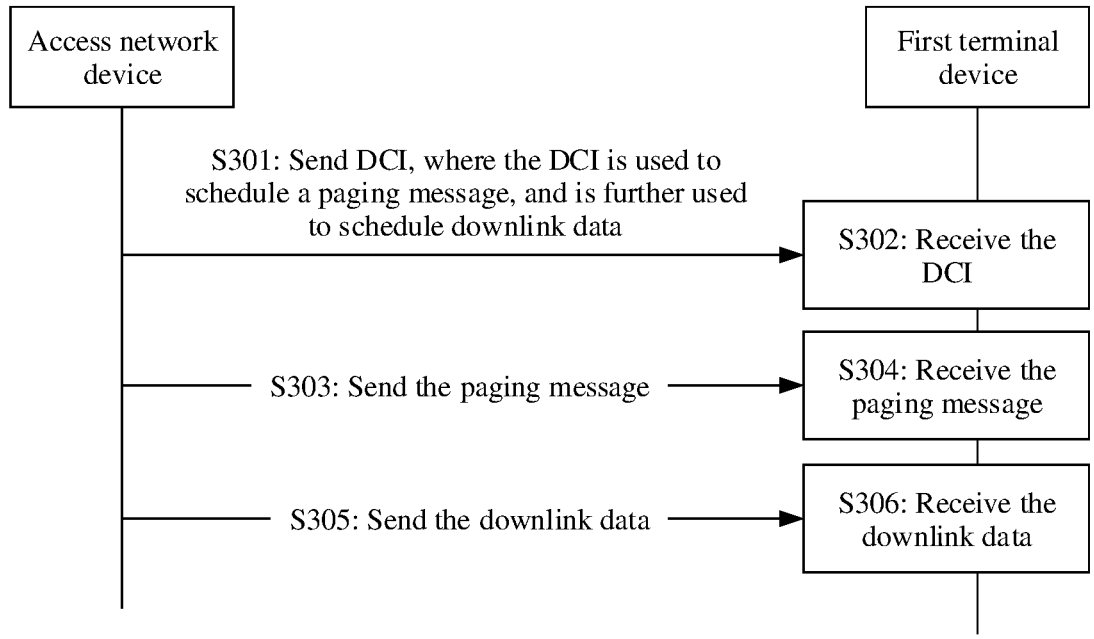
FIG. 3A to FIG. 3E are a flowchart of interaction in a first data transmission method according to an embodiment of this application.

FIG. 3A is a schematic flowchart of a first data transmission method according to this embodiment of this application. Refer to FIG. 3A. The method includes the following steps.

Step 301: An access network device sends downlink control information (Downlink Control Information, DCI) to a first terminal device, where the DCI is used to schedule a paging message, and is further used to schedule downlink data. Specifically, the DCI may include first scheduling information, the first scheduling information is used to schedule the paging (Paging) message, and the DCI is further used to schedule the downlink data.

In a possible implementation, the downlink data may be data carried on a physical downlink shared channel (physical downlink shared channel, PDSCH), or includes at least one of the following: (1) downlink user data (downlink user data); (2) an RRC message; or (3) response message configuration information, where the response message configuration information is used to indicate a time-frequency location for sending a response message, and the response message is used to respond to the downlink data or the paging message.

In a possible implementation, the access network device may send the DCI to a plurality of terminal devices served by the access network device, and the plurality of terminal devices include the first terminal device.

In a possible implementation, the DCI is scrambled by using a paging radio network temporary identifier (paging radio network temporary identifier, P-RNTI).

When the DCI is further used to schedule the downlink data, there may be the following several possible implementations:

In a first possible implementation, the DCI may further include third indication information, and the third indication information may indicate a time-frequency location of the downlink data.

In a second possible implementation, the DCI may further include second indication information, and the second indication information may be used to indicate at least one of the following: (1) there is downlink data that is scheduled using the DCI and that is to be sent to the terminal device; (2) the DCI is used to schedule the downlink data; (3) the downlink data is to be received after the paging message is received; (4) the downlink data is to be received based on the DCI; (5) the downlink data is to be received by using the paging-based early transmission method for downlink data; (6) the DCI includes scheduling information for the downlink data; or (7) the DCI includes the third indication information.

In the second possible implementation, the second indication information is used by the first terminal device to determine that there is the downlink data scheduled using the DCI. It should be noted that the downlink data is sent by a network device to the terminal device after the DCI is sent, and the second indication information only indicates that there is the downlink data corresponding to the terminal device, but imposes no limitation on whether the downlink data has arrived. The terminal device may receive the downlink data based on the scheduling information for the downlink data.

With reference to the second possible implementation, in a specific implementation, one bit in the DCI is used to represent the second indication information. When the bit is set to 1, the bit is used to indicate that there may be the downlink data scheduled using the DCI. When the bit is set to 0, the bit is used to indicate that there is no downlink data scheduled using the DCI.

In a third possible implementation, the DCI may include the second indication information and the third indication information, and the second indication information is used by the first terminal device to determine the third indication information.

In a fourth possible implementation, the DCI includes the third indication information. The first terminal device further receives system information, where the system information includes fifth indication information, and the fifth indication information may be used to indicate: (1) the DCI for scheduling the paging message includes the scheduling information for the downlink data; or (2) a current cell or the access network device supports paging DCI-based downlink data transmission.

In the fourth possible implementation, the fifth indication information is used by the first terminal device to determine the third indication information.

In a fifth possible implementation, the DCI may include the second indication information. The first terminal device further receives system information, where the system information includes sixth indication information, the sixth indication information may be used to indicate a time-frequency location for sending the downlink data, and the second indication information is used by the first terminal device to determine the sixth indication information.

Step 302: The first terminal device receives the DCI.

In a possible implementation, the first terminal device receives a PDCCH scrambled by using the P-RNTI, where the PDCCH carries the DCI.

Specifically, the first terminal device determines the scheduling information for the paging message based on the received DCI.

In a possible implementation, if the first terminal device supports the data transmission method, the first terminal device may determine whether the DCI includes the third indication information; and if yes, the first terminal device may determine that the DCI includes the third indication information, that is, determine that there may be the downlink data scheduled using the DCI. Further, the first terminal device may determine the time-frequency location of the downlink data based on the third indication information.

In a possible implementation, if the first terminal device supports the data transmission method, the first terminal device determines whether the DCI includes the second indication information. If the DCI includes the second indication information, the first terminal device may determine that the DCI includes the second indication information, that is, may determine that there may be the downlink data scheduled using the DCI. The first terminal device determines the third indication information based on the second indication information, and then may determine the time-frequency location of the downlink data based on the third indication information.

In a possible implementation, the first terminal device further receives the system information. If the first terminal device supports the data transmission method, the first terminal device determines whether the system information includes the fifth indication information. If the system information includes the fifth indication information, the first terminal device determines the third indication information from the DCI based on the fifth indication information, and determines the time-frequency location of the downlink data based on the third indication information.

Step 303: The access network device sends the paging message to the first terminal device.

Specifically, the paging message includes an identifier of the first terminal device. For example, the identifier of the first terminal device may be an SAE temporary mobile subscriber identity (SAE temporary mobile subscriber identity, S-TMSI), an identifier for indicating a context of the terminal device, or an inactive radio network temporary identifier (inactive radio network temporary identifier, I-RNTI).

In a possible implementation, the paging message is sent to the plurality of terminal devices served (serve) by the access network device. In other words, all the plurality of terminal devices served by the access network device receive the paging message. The paging message is used to page a terminal device. For example, a base station serves $UE_1$, $UE_2$, . . . , and $UE_M$, and the paging message may be sent to the $UE_1$, the $UE_2$, . . . , and the $UE_M$. In this way, all the $UE_1$, the $UE_2$, . . . , and the $UE_M$ may receive the paging message.

In a possible implementation, if the paging message includes only the identifier of the first terminal device, and the DCI includes the third indication information, the identifier and the third indication information are used by the first terminal device to determine that there is the downlink data scheduled using the DCI.

In this application, downlink data corresponding to the first terminal device may be referred to as first downlink data.

In a possible implementation, the paging message includes one or more identifiers identifiers of one or more terminal devices, and further includes first indication information, where the one or more terminal devices include the first terminal device, and the first indication information may be used to indicate: (1) there are one or more pieces of downlink data corresponding to the one or more terminal devices to be sent using the DCI; (2) there are one or more pieces of downlink data corresponding to the one or more terminal devices; (3) there are one or more pieces of downlink data corresponding to the one or more terminal devices to be sent; (4) the one or more terminal devices are to correspondingly receive one or more pieces of downlink data; (5) the one or more terminal devices are to correspondingly receive one or more pieces of early transmitted downlink data; or (6) paging-based downlink data transmission is to be performed.

In this way, after receiving the paging message, the one or more terminal devices may determine, based on the first indication information, that there is the downlink data corresponding to the one or more terminal devices. In this implementation, the first indication information may indicate that the downlink data is to arrive at the terminal devices corresponding to all the identifiers of the terminal devices included in the paging message. It should be noted that, in embodiments of this application, "there is downlink data" means that there is downlink data to be transmitted by using the method provided in this application.

In this implementation, the identifier of the terminal device included in the paging message may be denoted as $UE\text{-}Id_i^{Data}$, where a value of i is $\{1, \ldots, N\}$, and N is a positive integer. The identifier of the first terminal device may be denoted as $UE\text{-}Id_J^{Data}$, where $UE\text{-}Id_J^{Data}$ is included in $UE\text{-}Id_i^{Data}$, and $1 \leq J \leq N$, that is, a position of the identifier of the terminal device in an identifier list is J, in other words, a $J^{th}$ identifier in the identifier list is the identifier of the first terminal device.

In a possible implementation, the paging message includes the first indication information. The first indication information includes at least one piece of indication information. The at least one piece of indication information one-to-one corresponds to the identifier of the at least one terminal device in the paging message, and indicates whether there is the downlink data corresponding to the at least one terminal device. Optionally, the at least one piece of indication information may be at least one field, and each field is used to indicate whether there is downlink data to arrive at the corresponding terminal device. Alternatively, the first indication information may include only a terminal device identifier set, and the terminal device identifier set includes the identifier of the at least one terminal device. For example, the first indication information may include only the identifier of the first terminal device. For another example, the first indication information may include identifiers of at least two terminal devices.

In a possible implementation, the first indication information includes the identifier of the terminal device and/or the at least one piece of indication information. The at least one piece of indication information indicates whether there is the downlink data corresponding to the at least one terminal device. Whether there is the downlink data corresponding to the at least one terminal device may be jointly indicated by the identifier of the terminal device and the indication information or may be indicated only by the identifier of the terminal device. For example, the first indication information may include the identifier of the first terminal device and the indication information. If the indication information corresponding to the identifier (UEID) of the terminal device is True, it indicates that there is the downlink data for the terminal device. If the indication information corresponding to the UEID is False, it indicates that there is no downlink data for the terminal device. For another example, the first indication information may include the identifiers of the at least two terminal devices and indication information (for example, True or False) corresponding to each terminal device. For another example, the identifier of the terminal device is sent, so that the first indication information implicitly indicates that the terminal device corresponding to the identifier needs to receive the downlink data.

In another possible implementation, one piece of indication information indicates that there is downlink data to arrive at a terminal device corresponding to a UEID in a paging record list. Specifically, the pagingrecordlist (an identifier list of paged UE) in the paging message may integrally correspond to one piece of indication information, and the indication information indicates that there is downlink data to arrive at all terminal devices in the pagingrecordlist. For example, the pagingrecordlist in the paging message may include only the identifier of the first terminal device or identifiers of at least two terminal devices, and the indication information corresponding to the pagingrecordlist is True. Therefore, the terminal devices corresponding to all the UEIDs in the pagingrecordlist need to receive the downlink data. It should be noted that a quantity of pieces of downlink data is not limited in this embodiment. The plurality of terminal devices corresponding to all the UEIDs in the pagingrecordlist may correspond to same downlink data, or may correspond to different downlink data. For example, at least one piece of downlink data one-to-one corresponds to at least one UEID, so that the UE may determine a sequence of the downlink data based on a sequence of the UEIDs.

For another example, the first indication information is a set of indication information and terminal device identifiers in a paging record list (an identifier list of paged UE) in Table 1. The paging record list includes identifiers (UE-Id$_1$, UE-Id$_2$, ..., UE-Id$_{M-1}$, UE-Id$_M$) of a plurality of paged terminal devices. If indication information corresponding to the UE$_1$ is True, it indicates that there is downlink data for the UE$_1$. If indication information corresponding to the UE$_2$ is False, it indicates that there is no downlink data for the UE$_2$. M is a positive integer.

In this implementation, a terminal device identifier corresponding to indication information True may be denoted as UE-Id$_i^{Data}$ based on a position of the terminal device identifier in the identifier list, where a value of i is $\{1, \ldots, N\}$, N is a positive integer, and N≤M. The identifier of the first terminal device may be denoted as UE-Id$_J^{Data}$, where UE-Id$_J^{Data}$ is included in UE-Id$_i^{Data}$, and 1≤J≤N, that is, the position of the identifier of the first terminal device in the identifier list is J, in other words, the J$^{th}$ identifier in the identifier list is the identifier of the first terminal device.

TABLE 1

| UE | Paging record list (identifier list of paged UE) | Indication information |
|---|---|---|
| UE$_1$ | UE-Id$_1$ | True |
| UE$_2$ | UE-Id$_2$ | False |
| UE$_3$ | UE-Id$_3$ | True |
| ... | ... | ... |
| UE$_J$ | UE-Id$_J$ | True |
| ... | ... | ... |
| UE$_{M-1}$ | UE-Id$_{M-1}$ | False |
| UE$_M$ | UE-Id$_M$ | True |

In a possible implementation, the paging message includes first indication information and an identifier list (namely, a pagingrecordlist) of terminal devices. The first indication information may be used to indicate: (1) a quantity N of downlink data transport blocks to be sent by using the method provided in this application; (2) a quantity N of identifiers of terminal devices at which the downlink data is to arrive; (3) a quantity N of pieces of downlink data; or (4) a quantity N of terminal devices corresponding to the downlink data.

For example, the pagingrecordlist includes M+N terminal device identifiers. If the first indication information is N, there is downlink data for terminals UE$_{M+1}$, UE$_{M+2}$, ..., UE$_{M+N-1}$, and UE$_{M+N}$ corresponding to last N terminal device identifiers (namely, UE-Id$_{M+1}$, UE-Id$_{M+2}$, ..., UE-Id$_{M+N-1}$, and UE-Id$_{M+N}$ in Table 2) in the pagingrecordlist. A terminal device identifier corresponding to a terminal device at which the downlink data is to arrive is denoted as UE-Id$_i^{Data}$ based on a position of the terminal device identifier in the identifier list, where a value of i is $\{1, \ldots, N\}$, and N is a positive integer. The identifier of the first terminal device may be denoted as UE-Id$_J^{Data}$, where UE-Id$_J^{Data}$ is included in UE-Id$_i^{Data}$, and 1≤J≤N, that is, a position of the identifier of the first terminal device in the identifier list is J, in other words, a J$^{th}$ identifier in the identifier list is the identifier of the first terminal device.

Alternatively, for example, if the first indication information is N, there is downlink data for terminal devices UE$_1$, UE$_2$, ..., UE$_{N-1}$, and UE$_N$ corresponding to first N terminal identifiers (namely, UE-Id$_1$, UE-Id$_2$, ..., UE-Id$_{N-1}$, and UE-Id$_N$ in Table 2a) in the pagingrecordlist. A terminal device identifier corresponding to a terminal device at which the downlink data is to arrive is denoted as UE-Id$_i^{Data}$ based on a position of the terminal device identifier in the identifier list, where a value of i is $\{1, \ldots, N\}$, and N is a positive integer. The identifier of the first terminal device may be denoted as UE-Id$_J^{Data}$, where UE-Id$_J^{Data}$ is included in UE-Id$_i^{Data}$, and 1≤J≤N, that is, a position of the identifier of the first terminal device in the identifier list is J, in other words, a J$^{th}$ identifier in the identifier list is the identifier of the first terminal device.

TABLE 2

| UE | Paging record list (identifier list of paged UE) |
|---|---|
| $UE_1$ | $UE\text{-}Id_1$ |
| $UE_2$ | $UE\text{-}Id_2$ |
| ... | ... |
| $UE_{M-1}$ | $UE\text{-}Id_{M-1}$ |
| $UE_M$ | $UE\text{-}Id_M$ |
| $UE_{M+1}$ | $UE\text{-}Id_{M+1}$ |
| $UE_{M+2}$ | $UE\text{-}Id_{M+2}$ |
| ... | ... |
| $UE_{M+N-1}$ | $UE\text{-}Id_{M+N-1}$ |
| $UE_{M+N}$ | $UE\text{-}Id_{M+N}$ |

TABLE 2A

| UE | Paging record list (identifier list of paged UE) |
|---|---|
| $UE_1$ | $UE\text{-}Id_1$ |
| $UE_2$ | $UE\text{-}Id_2$ |
| ... | ... |
| $UE_{N-1}$ | $UE\text{-}Id_{N-1}$ |
| $UE_N$ | $UE\text{-}Id_N$ |
| $UE_{N+1}$ | $UE\text{-}Id_{N+1}$ |
| $UE_{N+2}$ | $UE\text{-}Id_{N+2}$ |
| ... | ... |
| $UE_{N+M-1}$ | $UE\text{-}Id_{N+M-1}$ |
| $UE_{N+M}$ | $UE\text{-}Id_{N+M}$ |

In a possible implementation, the paging message includes the first indication information. The first terminal device further receives the system information, where the system information includes the fifth indication information, and the fifth indication information may be used to indicate:

(1) the DCI for scheduling the paging message includes the scheduling information for the downlink data; or (2) the current cell or the access network device supports the paging DCI-based downlink data transmission.

In a fourth possible implementation, the fifth indication information is used by the first terminal device to determine the time-frequency location.

In the fifth possible implementation, the paging message includes the first indication information. The first terminal device further receives the system information, where the system information includes the sixth indication information, the sixth indication information may be used to indicate the time-frequency location for sending the downlink data, and the first indication information is used by the first terminal device to determine the sixth indication information.

In the foregoing possible implementation, after sending the paging message, the access network device sequentially sends the downlink data for the $UE\text{-}Id_i^{Data}$ at a time-frequency location (denoted as $TF\text{-}Location_i$). The time-frequency location of the downlink data for the first terminal device being $TF\text{-}Location_J$ means that the access network device sends the downlink data for the first terminal device at a $J^{th}$ time-frequency location for sending the downlink data.

Step 304: The first terminal device receives the paging message from the access network device.

Specifically, the first terminal device receives the paging message based on the first scheduling information, and determines that the paging message includes the identifier of the first terminal device.

Figure 3B:
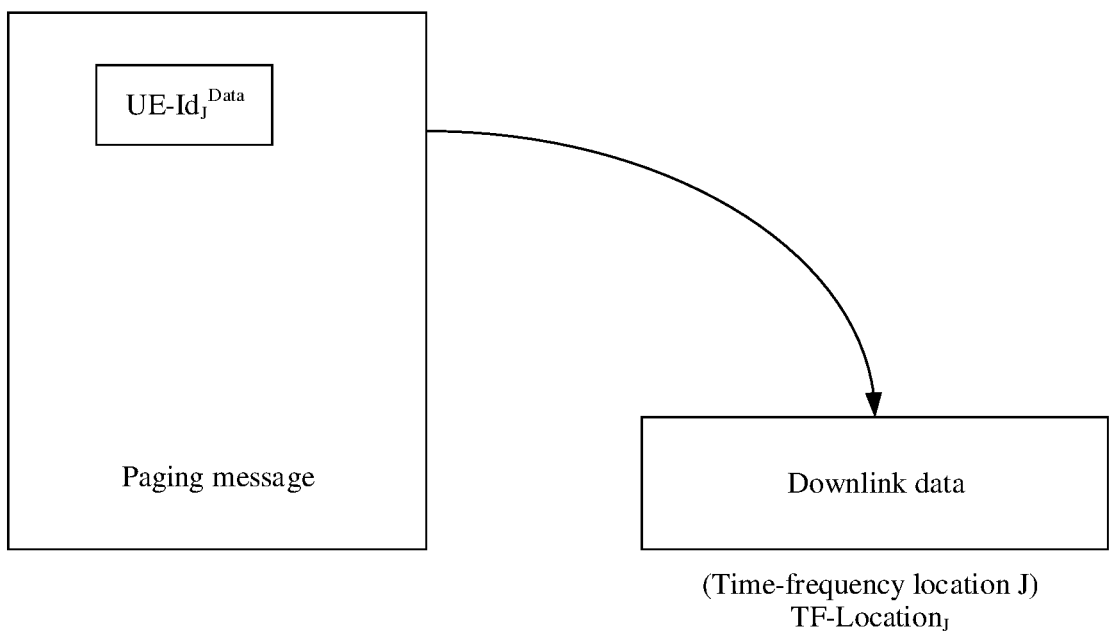

In a possible implementation, if the first terminal device determines that the paging message includes only the identifier of the first terminal device and that the DCI includes the third indication information, the terminal device determines the time-frequency location of the downlink data based on the third indication information. Refer to FIG. 3B. A paging message includes third indication information, the third indication information indicates a time-frequency location of first downlink data for the first terminal device $UE\text{-}Id_J^{Data}$, and there is a correspondence between the third indication information and the first downlink data. After receiving the third indication information, the first terminal device determines the time-frequency location of the first downlink data based on the third indication information.

Figure 3C:
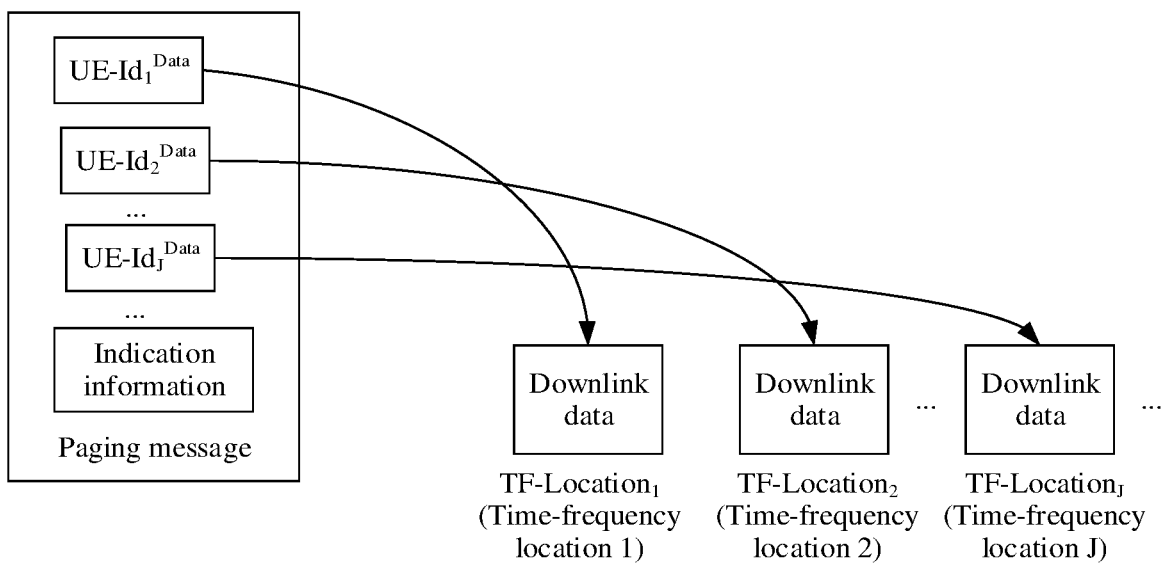

In a possible implementation, the first terminal device determines that the paging message includes the identifier of the first terminal device and the indication information and that the DCI includes the third indication information, where the indication information indicates whether there is the downlink data for the first terminal device. The first terminal device determines, based on the paging message, that the position of the identifier of the first terminal device in the paging message is J. The first terminal device determines the time-frequency location $TF\text{-}Location_J$ of the downlink data for the first terminal device based on the third indication information, the first indication information, and the position J of the identifier of the first terminal device in the paging message. Refer to FIG. 3C. A paging message includes third indication information, the third indication information indicates time-frequency locations of downlink data for terminal devices that correspond to $UE\text{-}Id_1$, $UE\text{-}Id_2$, ..., and $UE\text{-}Id_J$ and at which downlink data is to arrive, and there is a correspondence between the third indication information and the downlink data. After receiving the third indication information, the terminal device determines the time-frequency location of the corresponding downlink data based on the third indication information.

Figure 3D:
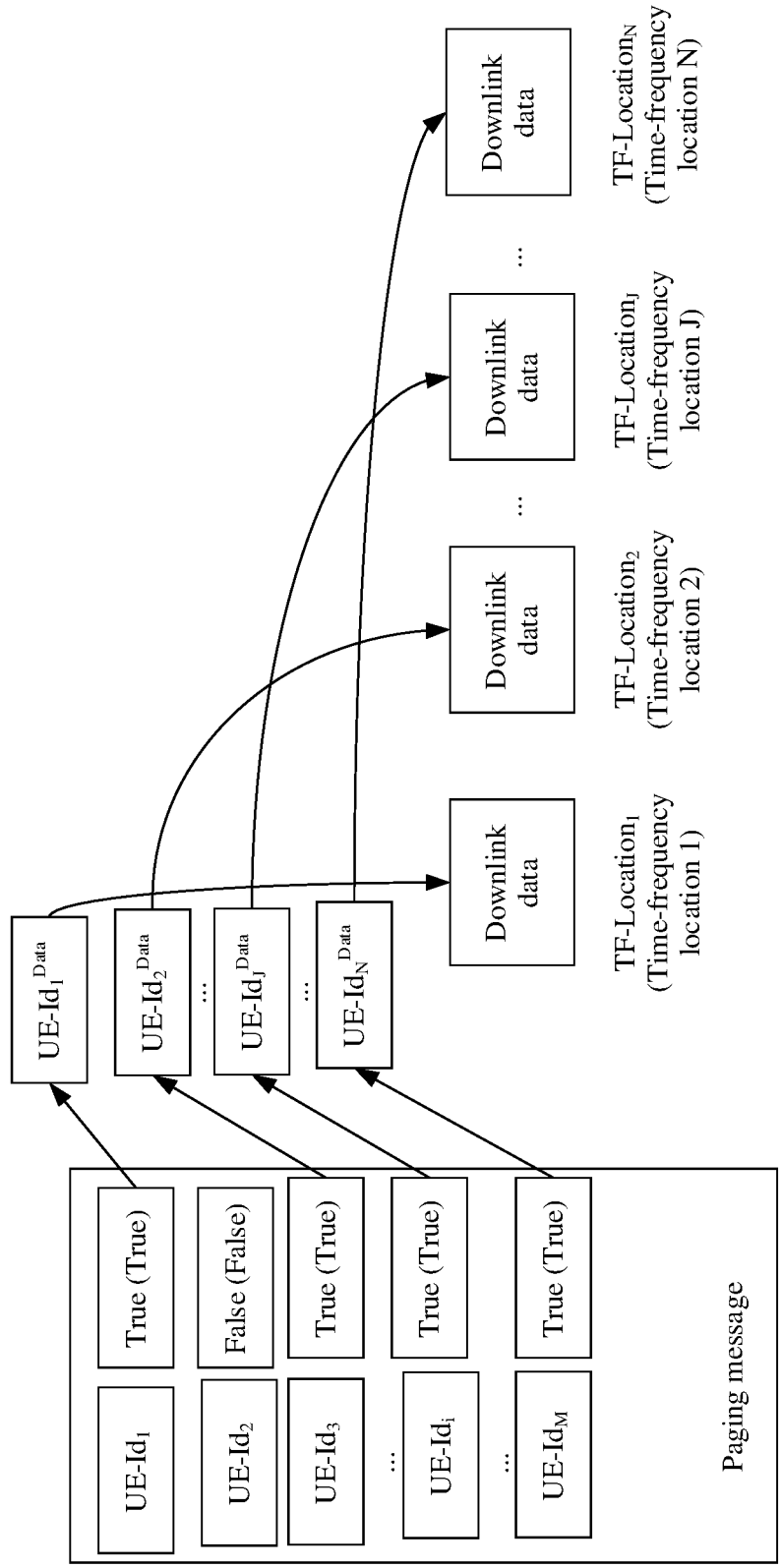

In a possible implementation, the first terminal device determines that the paging message includes the identifier of the first terminal device and the first indication information corresponding to the first terminal device and that the DCI includes the third indication information. The first terminal device determines, based on the paging message, that the position of the identifier of the first terminal device in the paging message is J (only the identifier of the terminal device at which the downlink data is to arrive is considered during determining of J). The first terminal device determines the time-frequency location $TF\text{-}Location_J$ of the downlink data for the first terminal device based on the third indication information, the first indication information, and the position J of the identifier of the first terminal device in the paging message. Refer to FIG. 3D. A paging message includes first indication information, third indication information, and indication information (True, False, True, True, True) corresponding to terminal devices, where the first indication information is identifiers ($UE\text{-}Id_1$, $UE\text{-}Id_2$, ..., $UE\text{-}Id_i$, ..., and $UE\text{-}Id_M$) of the terminal devices. Identifiers of terminal devices corresponding to the indication information True are denoted as $UE\text{-}Id_1^{Data}$, $UE\text{-}Id_2^{Data}$, ..., $UE\text{-}Id_J^{Data}$, ..., and $UE\text{-}Id_N^{Data}$ based on positions of the identifiers in an identifier list. The third indication information indicates time-frequency locations of downlink data for the terminal devices that correspond to $UE\text{-}Id_1^{Data}$, $UE\text{-}Id_2^{Data}$, ..., $UE\text{-}Id_J^{Data}$, ..., and $UE\text{-}Id_N^{Data}$ and at which the downlink data is to arrive, where there is a correspondence between the third indication information and the downlink data. After receiving the third indication information, the terminal device determines the time-frequency location of the corresponding downlink data based on the third indication information.

Step 305: The access network device sends the downlink data to the first terminal device.

In a possible implementation, the downlink data is carried in RRC signaling.

In a possible implementation, the access network device sends the downlink data only to the first terminal device.

Figure 3E:
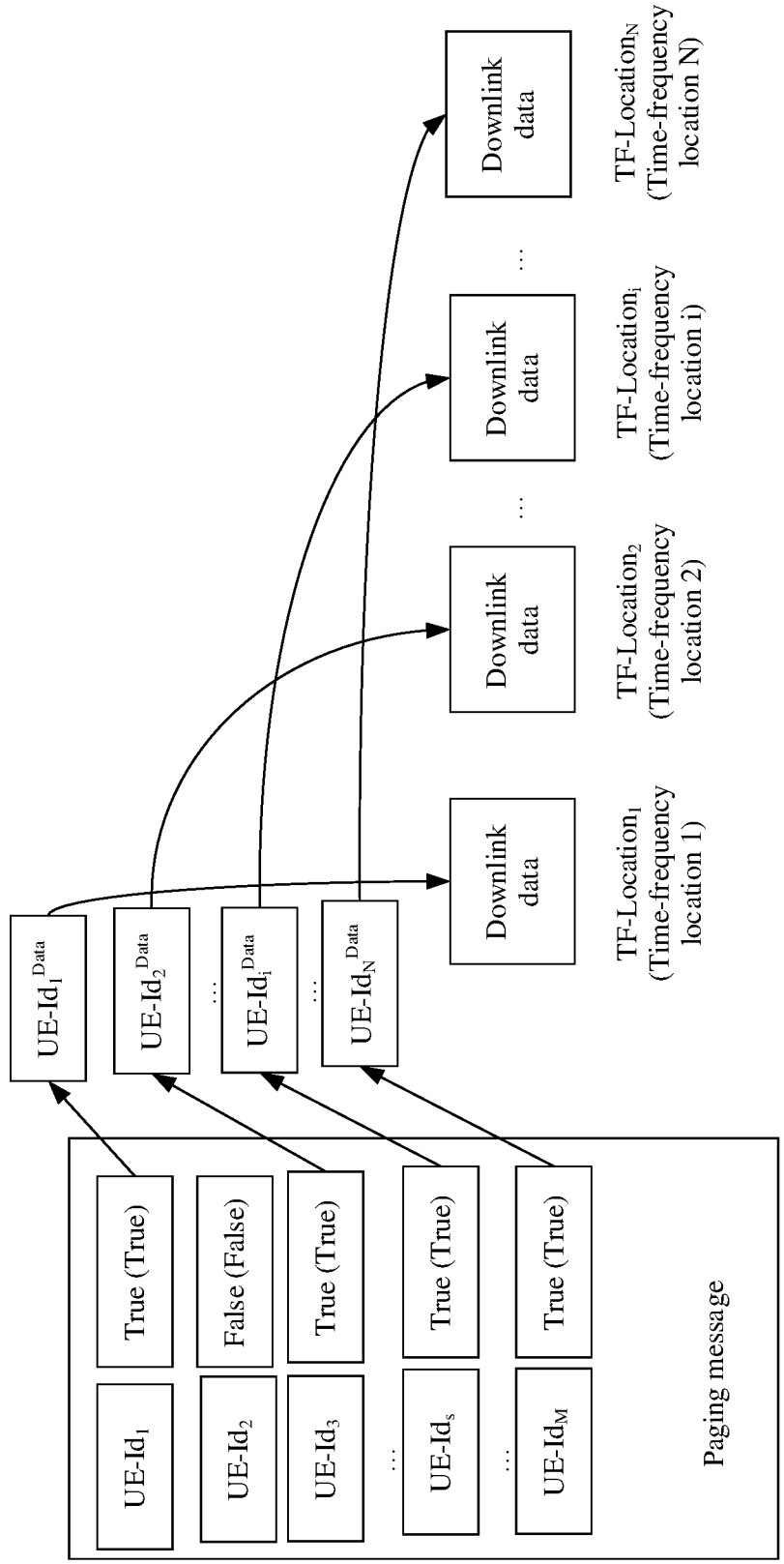

In a possible implementation, the access network device sends one or more pieces of downlink data to one or more terminal devices, where the one or more terminal devices are in a one-to-one correspondence with the one or more pieces of downlink data. In this implementation, the access network device sends an $i^{th}$ piece of downlink data to an $i^{th}$ terminal device that corresponds to an $i^{th}$ terminal device identifier in the paging message and at which the downlink data is to arrive, where a value of i is $\{1, \ldots, N\}$, and N is a quantity of pieces of downlink data. The N pieces of downlink data are in a one-to-one correspondence with identifiers in the paging message that are of N terminal devices at which the downlink data is to arrive. Refer to FIG. 3E and FIG. 3D. A paging message includes first indication information, third indication information, and indication information (True, False, True, True, True) corresponding to terminal devices, where the first indication information is identifiers (UE-Id$_1$, UE-Id$_2$, ..., UE-Id$_s$, ..., and UE-Id$_M$) of the terminal devices. Identifiers of terminal devices corresponding to the indication information True are denoted as UE-Id$_1^{Data}$, UE-Id$_2^{Data}$, ..., UE-Id$_i^{Data}$, ..., and UE-Id$_N^{Data}$ based on positions of the identifiers in the identifier list. The third indication information indicates time-frequency locations of downlink data for the terminal devices that correspond to UE-Id$_1^{Data}$, UE-Id$_2^{Data}$, ..., UE-Id$_i^{Data}$, ..., and UE-Id$_N^{Data}$ and at which the downlink data is to arrive, where there is a correspondence between the third indication information and the downlink data. After receiving the third indication information, the terminal device determines the time-frequency location of the corresponding downlink data based on the third indication information.

Step 306: The first terminal device receives the downlink data from the access network device.

Specifically, in a possible implementation, if the access network device sends the downlink data only to the first terminal device, the first terminal device receives the downlink data from the access network device at the time-frequency location that is of the downlink data and that is determined based on the third indication information in step 304.

Specifically, in a possible implementation, in addition to sending the downlink data to the first terminal device, the access network device further sends downlink data to another terminal device. The first terminal device receives data on a $J^{th}$ downlink data transport block from the access network device based on the third indication information and the position J, in the identifier list, of the identifier of the first terminal device at which the downlink data is to arrive.

It can be learned from the foregoing technical solution that the access network device may send the downlink data to the terminal device after sending the paging message, so that the terminal device can receive the downlink data as early as possible. The downlink data can be transmitted in advance through a simplified signaling or data exchange process, so that resource utilization can be improved, and power consumption of the terminal device can be reduced. In addition, in this embodiment, the paging message does not carry the downlink data or the scheduling information for the downlink data, so that a paging capacity is not reduced.

The following further describes various manners of indicating the time-frequency location of the downlink data in the embodiment shown in FIG. 3A.

Case 1: The paging message includes only the identifier of the first terminal device.

Manner 1: That the third indication information may indicate the time-frequency location for sending the downlink data includes: The third indication information includes a data frequency-domain resource indicator (Frequency domain resource assignment-Data) and/or a data time-domain resource indicator (Time domain resource assignment-Data), where the data frequency-domain resource indicator indicates a frequency-domain location for sending the downlink data, and the data time-domain resource indicator indicates a time-domain location for sending the downlink data.

The following Table 3 is used as an example. The DCI may be in a DCI format 1_0 (DCI format 1_0), and includes information fields in the following table. A paging frequency-domain resource indicator (Frequency domain resource assignment) and a paging time-frequency resource indicator (Time domain resource assignment) are used to indicate a frequency-domain location and a time-domain location for sending the paging message, and the data frequency-domain resource indicator (Frequency domain resource assignment-Data) and a data time-frequency resource indicator (Time domain resource assignment-Data) are used to indicate the frequency-domain location and a time-frequency location for sending the downlink data. In this application, X, Y, and Z are positive integers.

Figure 4A:
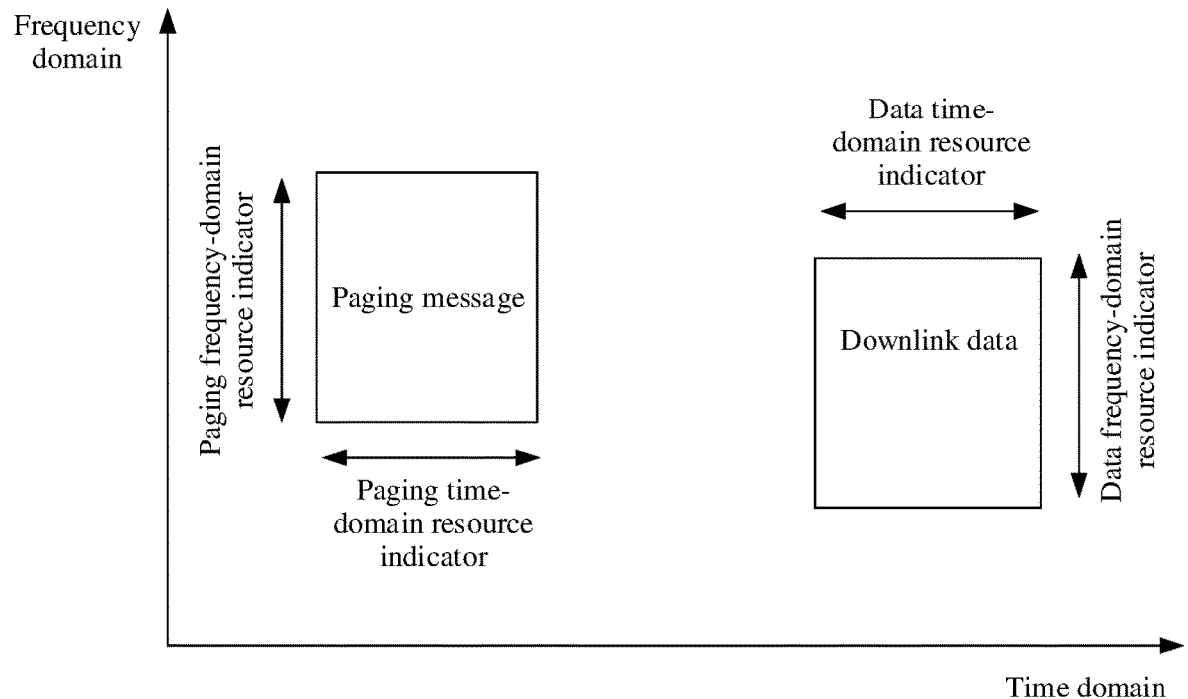
FIG. 4A to FIG. 4C each are a schematic diagram of an offset according to an embodiment of this application.

In a possible implementation, as shown in FIG. 4A, if the third indication information does not include the data frequency-domain resource indicator, the paging frequency-domain resource indicator indicates the frequency-domain location for sending the downlink data; if the third indication information does not include the data time-domain resource indicator, the paging time-domain resource indicator indicates the time-domain location for sending the downlink data.

TABLE 3

| Information field | Quantity of bits |
|---|---|
| Short Messages Indicator (SMS message indicator) | 2 bits |
| Short Messages (SMS message) | 8 bits (reserved bits) |
| Frequency domain resource assignment (paging frequency-domain resource indicator) | X bits |
| Time domain resource assignment (paging time-domain resource indicator) | 4 bits |
| Frequency domain resource assignment-Data (data frequency-domain resource indicator) | Y bits |
| Time domain resource assignment-Data (data time-domain resource indicator) | Z bits |
| VRB-to-PRB mapping (VRB-to-PRB mapping) | 1 bit |
| MCS (modulation and coding scheme) | 5 bits |
| TB scaling (TB scaling) | 2 bits |
| Reserved bits (reserved bits) | 6 bits |

In a possible implementation, the modulation and coding scheme MCS and/or the TB scaling (TB scaling) in the foregoing table may be used for the downlink data.

In a possible implementation, MCS information and/or TB scaling information of the downlink data are/is included in the system information.

In a possible implementation, the first terminal device determines at least one of the following based on the first scheduling information: (1) a start time point $T_{startPaging}$ of a time-frequency resource of the paging message; (2) duration (duration$_{Paging}$) occupied by a time-frequency resource of the paging message; (3) an end time point $T_{EndPaging}$ of a time-frequency resource of the paging message; (4) a start frequency-domain location $F_{startPaging}$ of a time-frequency resource of the paging message; (5) a frequency-domain width (frequency-width$_{Paging}$) of a time-frequency resource of the paging message; or (6) an end frequency-domain location $F_{EndPaging}$ of a time-frequency resource of the paging message.

The start time point and the end time point may be in a unit of symbols, slots, or subframes. The duration may be several symbols, slots, or subframes. The start frequency-domain location and the end frequency-domain location may be a subcarrier or a time-frequency resource block. The frequency-domain width may be several time-frequency resource blocks (physical resource blocks, PRBs).

Manner 2: The third indication information may include a data frequency-domain offset (Frequency domain Offset-Data) and/or a data time-domain offset (Time domain Offset-Data). The data frequency-domain offset indicates an offset of a frequency-domain location for sending the downlink data relative to a frequency-domain location (a start frequency-domain location or an end frequency-domain location) for sending the paging message, and the data time-domain offset indicates an offset of a time-domain location for sending the downlink data relative to a time-domain location (a start time point or an end time point) for sending the paging message.

The following Table 4 is used as an example. The DCI may be in a DCI format 1_0 (DCI format 1_0), and includes information fields in the following table. A paging frequency-domain resource indicator (Frequency domain resource assignment) and a paging time-frequency resource indicator (Time domain resource assignment) are used to indicate a frequency-domain location and a time-domain location for sending the paging message, and the data frequency-domain offset (Frequency domain Offset-Data) and the data time-frequency offset (Time domain Offset-Data) are respectively used to indicate the offset of the frequency-domain location for sending the downlink data relative to the frequency-domain location for sending the paging message and the offset of the time-frequency location for sending the downlink data relative to the time-frequency location for sending the paging message.

Figure 4B:
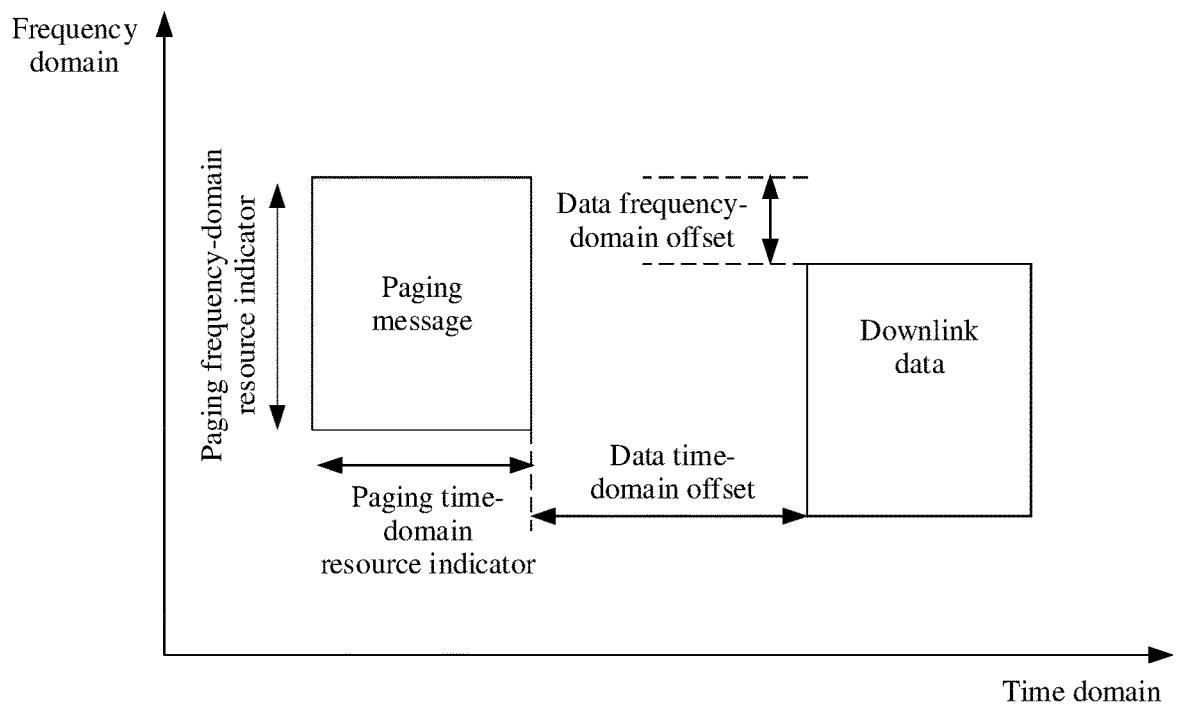

In a possible implementation, as shown in FIG. 4B, if the third indication information does not include the data frequency-domain offset, the paging frequency-domain resource indicator indicates the frequency-domain location for sending the downlink data; if the third indication information does not include the data time-domain offset, the paging time-domain resource indicator indicates the time-domain location for sending the downlink data.

TABLE 4

| Information field | Quantity of bits |
|---|---|
| Short Messages Indicator (SMS message indicator) | 2 bits |
| Short Messages (SMS message) | 8 bits (reserved bits) |
| Frequency domain resource assignment (paging frequency-domain resource indicator) | X bits |
| Time domain resource assignment (paging time-domain resource indicator) | 4 bits |

TABLE 4-continued

| Information field | Quantity of bits |
|---|---|
| Frequency domain Offset-Data (data frequency-domain offset) | Y bits |
| Time domain Offset-Data (data time-domain offset) | Z bits |
| VRB-to-PRB mapping (VRB-to-PRB mapping) | 1 bit |
| MCS (modulation and coding scheme) | 5 bits |
| TB scaling (TB scaling) | 2 bits |
| Reserved bits (reserved bits) | 6 bits |

Manner 3: That the third indication information may indicate the time-frequency location for sending the downlink data includes: The third indication information includes a data frequency-domain resource indicator (Frequency domain resource assignment-Data) and a data time-domain offset (Time domain Offset-Data).

Manner 4: That the third indication information may indicate the time-frequency location for sending the downlink data includes: The third indication information includes a data time-domain resource indicator (Time domain resource assignment-Data) and a data frequency-domain offset (Frequency domain Offset-Data).

Manner 5: That the third indication information may indicate the time-frequency location for sending the downlink data includes: The third indication information indicates that the time-frequency location for sending the downlink data is a time-frequency location, indicated by the system information, for sending the downlink data.

Manner 6: That the third indication information may indicate the time-frequency location for sending the downlink data includes: The third indication information includes a data frequency-domain offset (Frequency domain Offset-Data) and/or a data time-domain offset (Time domain Offset-Data), where the data frequency-domain offset indicates an offset of a frequency-domain location for sending the downlink data relative to a frequency-domain location, indicated by the system information, for sending the downlink data, and the data time-domain offset indicates an offset of a time-domain location for sending the downlink data relative to a time-domain location, indicated by the system information, for sending the downlink data.

If the third indication information does not include the data frequency-domain offset, a data frequency-domain resource indicator indicated by the system information indicates the frequency-domain location for sending the downlink data. If the third indication information does not include the data time-domain offset, a data time-domain resource indicator indicated by the system information indicates the time-domain location for sending the downlink data.

Case 2: The paging message includes the identifiers of the one or more terminal devices.

Manner 1: That the third indication information may indicate the time-frequency location for sending the downlink data includes: The third indication information includes a time-frequency resource indicator list, where the time-frequency resource indicator list includes data frequency-domain resource indicators and data time-domain resource indicators of downlink data for N UEs. For example, the time-frequency resource indicator list is shown by content in a bold box in the following Table 5, and is in a list form. There are N pieces of Frequency domain resource assignment-Data (data frequency-domain resource indicators) and N pieces of Time domain resource assignment-Data (data time-domain resource indicators) following a paging time-domain resource indicator (Time domain resource assignment), where a $J^{th}$ piece of Frequency domain resource assignment-Data and a $J^{th}$ piece of Time domain resource assignment-Data are used to indicate the time-frequency location of the downlink data for the first terminal device.

TABLE 5

| Information field | Quantity of bits |
|---|---|
| Short Messages Indicator (SMS message indicator) | 2 bits |
| Short Messages (SMS message) | 8 bits (reserved bits) |
| Frequency domain resource assignment (paging frequency-domain resource indicator) | X bits |
| Time domain resource assignment (paging time-domain resource indicator) | 4 bits |
| Time-Frequency domain resource assignment list (time-frequency resource indicator list) | (1, . . . , N) |
| >Frequency domain resource assignment-Data (data frequency-domain resource indicator) | Y bits |
| >Time domain resource assignment-Data (data time-domainr esource indicator) | Z bits |
| VRB-to-PRB mapping (VRB-to-PRB mapping) | 1 bit |
| MCS (modulation and coding scheme) | 5 bits |
| TB scaling (TB scaling) | 2 bits |
| Reserved bits (reserved bits) | 6 bits |

In a possible implementation, the modulation and coding scheme MCS and/or the TB scaling (TB scaling) in the foregoing table may be used for the downlink data.

In a possible implementation, MCS information and/or TB scaling information of the downlink data are/is included in the system information.

In a possible implementation, the first terminal device determines at least one of the following based on the first scheduling information: (1) a start time point $T_{startPaging}$ of a time-frequency resource of the paging message; (2) duration (duration$_{Paging}$) occupied by a time-frequency resource of the paging message; (3) an end time point $T_{EndPaging}$ of a time-frequency resource of the paging message; (4) a start frequency-domain location $F_{startPaging}$ of a time-frequency resource of the paging message; (5) a frequency-domain width (frequency-width$_{Paging}$) of a time-frequency resource of the paging message; or (6) an end frequency-domain location $F_{EndPaging}$ of a time-frequency resource of the paging message.

The start time point and the end time point may be in a unit of symbols, slots, or subframes. The duration may be several symbols, slots, or subframes. The start frequency-domain location and the end frequency-domain location may be a subcarrier or a time-frequency resource block. The frequency-domain width may be several time-frequency resource blocks (physical resource blocks, PRBs).

Manner 2: That the third indication information may indicate the time-frequency location for sending the downlink data includes: The third indication information includes a data frequency-domain offset (Frequency domain Offset-Data) and/or a data time-domain offset (Time domain Offset-Data), where the data frequency-domain offset indicates an offset of a frequency-domain location for sending the downlink data relative to a frequency-domain location (a start frequency-domain location or an end frequency-domain location) for sending the paging message, and the data time-domain offset indicates an offset of a time-domain location for sending the downlink data relative to a time-domain location (a start time point or an end time point) for sending the paging message.

For example, the DCI sent by the access network device to the terminal device may be in a DCI format 1_0 (DCI format 1_0). There are the following information fields in the DCI format 1_0, as shown in Table 6.

TABLE 6

| Information field | Quantity of bits |
|---|---|
| Short Messages Indicator (SMS message indicator) | 2 bits |
| Short Messages (SMS message) | 8 bits (reserved bits) |
| Frequency domain resource assignment (frequency-domain resource indicator) | X bits |
| Time domain resource assignment (time-domain resource indicator) | 4 bits |
| VRB-to-PRB mapping (VRB-to-PRB mapping) | 1 bit |
| MCS (modulation and coding scheme) | 5 bits |
| TB scaling (TB scaling) | 2 bits |
| Reserved bits (reserved bits) | 6 bits |

In Table 6, one bit in the Short Messages in the DCI 1_0 may represent the second indication information, that is, may be used to indicate whether there is the downlink data. Alternatively, one bit in the Reserved bits in the DCI 1_0 may represent the second indication information, that is, may be used to indicate whether there is the downlink data.

Figure 4C:
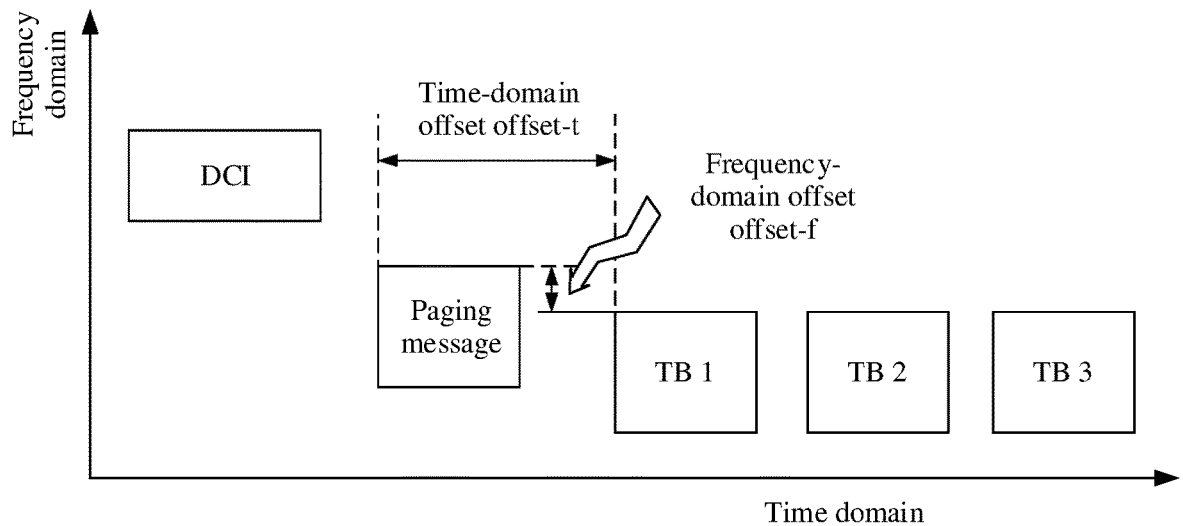

In Table 6, the frequency-domain resource indicator and the time-domain resource indicator in the DCI 1_0 may indicate a location at which the paging message is carried, for example, indicate a time-frequency location of a paging message in FIG. 4C. In a possible implementation, the third indication information may include at least one of the data frequency-domain offset and the data time-domain offset, and Y reserved bits in the reserved bits shown in the foregoing table may be used to indicate the at least one of the data time-domain offset and the data frequency-domain offset. For example, as shown in FIG. 4C, Offset_t indicates a time-domain offset between a time-frequency resource carrying the paging message and a time-frequency resource carrying downlink data (a TB 1), and Offset_f indicates a frequency-domain offset between the time-frequency resource carrying the paging message and the time-frequency resource carrying the downlink data (the TB 1). In this way, the terminal device may determine a time-frequency location of the TB 1 in FIG. 4C based on a location of the time-frequency resource of the paging message, Offset_t, and Offset_f. Further, Offset_t and/or Offset_f may be further used to indicate an offset between the time-frequency resource of the TB 1 and a time-frequency resource of a TB 2. By analogy, if the paging message indicates that there is downlink data to arrive at N terminal devices, time-frequency locations of N TBs may be indicated, where downlink data carried on an $i^{th}$ TB belongs to an $i^{th}$ terminal device in the N terminal devices at which the downlink data is to arrive as indicated, and a sequence of the N terminal devices is an appearance sequence of identifiers in an identifier list in the paging message that are of the terminal devices at which the downlink data is to arrive.

In a possible implementation, the first terminal device determines at least one of the following based on the system information or the DCI: (1) a start time point $T_{StartDataJ}$ of a time-frequency resource of the downlink data; (2) duration (duration$_{DataJ}$) occupied by a time-frequency resource of the downlink data; (3) an end time point $T_{EndDataJ}$ of a time-frequency resource of the downlink data; (4) a start frequency-domain location $F_{StartDataJ}$ of a time-frequency resource of the downlink data; (5) a frequency-domain width (freq-width$_{DataJ}$) of a time-frequency resource of the downlink data; or (6) an end frequency-domain location $F_{EndDataJ}$ of a time-frequency resource of the downlink data.

The start time point and the end time point may be in a unit of symbols, slots, or subframes. The duration may be several symbols, slots, or subframes. The start frequency-domain location and the end frequency-domain location may be a subcarrier or a time-frequency resource block. The frequency-domain width may be several time-frequency resource blocks (physical resource blocks, PRBs).

In a possible implementation, TStartDataJ=TStartPaging+durationPaging+JxOffset_t+(J−1)×(durationDataJ); TStartDataJ=TEndPaging+JxOffset_t+(J−1)×(durationDataJ); FStartDataJ=FStartPaging+(−1)K×freq-widthPaging+$\Sigma_{j=1}^{J}(-1)^{Hj}$Offset_f; FStartDataJ=FEndPaging+$\Sigma_{j=1}^{J}(-1)^{Hj}$Offset_f; FStartDataJ=FStartPaging+(−1)K×freq-widthPaging+$\Sigma_{j=1}^{J}(-1)^{Hj}$Offset_f+$\Sigma_{j=1}^{J}(-1)^{Hj}$freq-width$_{Dataj}$; or FStartDataJ=FEndPaging+$\Sigma_{j=1}^{J}(-1)^{Hj}$Offset_f+$\Sigma_{j=1}^{J}(-1)^{Hj}$freq-width$_{Dataj}$, where K is 0 or 1, and Hj is 0 or 1.

For example, as shown in Table 7, assuming that the first indication information indicates that an identifier of UE 1 is carried (that is, a bit is set to True), an identifier of UE 3 is carried (that is, a bit is set to True), and an identifier of UE 5 is carried (that is, a bit is set to True), it indicates that there is corresponding downlink data to arrive at the UE 1, the UE 3, and the UE 5. In this case, after receiving the paging message, the UE 1 first determines, based on a time-frequency location for carrying the paging message, Offset_t, and Offset_f, a time-frequency location for carrying the downlink data (which may be denoted as the first TB, for example, the TB 1) for the first UE (namely, the UE 1), and then determines, based on a position of the identifier of the UE in the UE identifier list, that the TB 1 belongs to the UE 1, the TB 2 belongs to the UE 3, and a TB 3 belongs to the UE 5. That is, the downlink data corresponding to the UE 1 is located on the TB 1, the downlink data corresponding to the UE 2 is located on the TB 2, and the downlink data corresponding to the UE 3 is located on the TB 3.

TABLE 7

| UE identifier | First indication information | TB |
| --- | --- | --- |
| Identifier of UE 1 | True | TB 1 |
| Identifier of UE 2 | | |
| Identifier of UE 3 | True | TB 2 |
| Identifier of UE 4 | | |
| Identifier of UE 5 | True | TB 3 |

It should be noted that, in another possible case, the Y reserved bits may indicate only the time-domain offset (Offset_t), and the frequency-domain offset (Offset_f) may be a default value; or the Y reserved bits may indicate only the frequency-domain offset (Offset_f), and the time-domain offset (Offset_t) may be a default value.

Manner 3: That the third indication information may indicate the time-frequency location for sending the downlink data includes: The third indication information includes a data frequency-domain resource indicator (Frequency domain resource assignment-Data) and a data time-domain offset (Time domain Offset-Data).

Manner 4: That the third indication information may indicate the time-frequency location for sending the downlink data includes: The third indication information includes a data time-domain resource indicator (Time domain resource assignment-Data) and a data frequency-domain offset (Frequency domain Offset-Data).

Manner 5: That the third indication information may indicate the time-frequency location for sending the downlink data includes: The third indication information indicates that the time-frequency location for sending the downlink data is a time-frequency location, indicated by the system information, for sending the downlink data.

Manner 6: That the third indication information may indicate the time-frequency location for sending the downlink data includes: The third indication information includes a data frequency-domain offset (Frequency domain Offset-Data) and/or a data time-domain offset (Time domain Offset-Data), where the data frequency-domain offset indicates an offset of a frequency-domain location for sending the downlink data relative to a frequency-domain location, indicated by the system information, for sending the downlink data, and the data time-domain offset indicates an offset of a time-domain location for sending the downlink data relative to a time-domain location, indicated by the system information, for sending the downlink data.

If the third indication information does not include the data frequency-domain offset, a data frequency-domain resource indicator indicated by the system information indicates the frequency-domain location for sending the downlink data. If the third indication information does not include the data time-domain offset, a data time-domain resource indicator indicated by the system information indicates the time-domain location for sending the downlink data.

For example, the system information includes fourth indication information. The fourth indication information indicates frequency-domain resource assignment (Frequency domain resource assignment-Data) for sending downlink data for the $1^{st}$ terminal device and/or time-domain resource assignment (Time domain resource assignment-Data) for sending the downlink data, and the third indication information includes a data frequency-domain offset (Frequency domain Offset-Data) and/or a data time-domain offset (Time domain Offset-Data). A time-frequency location for sending the downlink data for the $1^{st}$ terminal device that is in the identifier list in the paging message and at which the downlink data is to arrive may be determined based on the fourth indication information. A time-frequency location for sending downlink data for a terminal device other than the $1^{st}$ terminal device may be determined based on the fourth indication information and the third indication information.

For different information indicated in the fourth indication information, refer to the manner of determining the time-frequency location of the downlink data in the foregoing case 1, and details are not described herein again. Because the DCI may carry a limited quantity of bits, the method may help further reduce information carried in the DCI, to reduce load of the DCI as much as possible.

In a possible embodiment, before sending the downlink data to the terminal device, the access network device may obtain the downlink data in manners including but not limited to the following manners.

Manner 1: Before step S301 or step S300, a core network device actively sends a first message to the access network device, where the first message includes the downlink data to be sent to the terminal device. The first message carries the identifier of the terminal device. For example, the identifier of the terminal device may be the S-TMSI or the identifier for indicating the context of the terminal device. For example, the identifier of the context may be an S1 AP ID allocated by an MME, and the identifier is used to obtain the context of the terminal device from the MME. Alternatively, the identifier of the context may be an identifier allocated by the access network device. For example, a resume identifier (resume ID) is an identifier allocated by a base station that communicates with the terminal device last time, and the identifier is sent by the base station that communicates with the terminal device last time to the MME by using a terminal device context suspend request (UE context suspend request).

Manner 2: Before step S301 or step S300, the access network device sends, to a core network device, a data request message for requesting the downlink data, and obtains the downlink data from a data request response message that is sent by the core network device and that includes the downlink data.

In a possible embodiment, when determining that downlink data needs to be sent to the terminal device, the access network device may resume the context of the terminal device. The context of the terminal device includes a radio bearer (radio bearer, RB) configuration or a security context. For example, the identifier of the context may be an S1 AP ID allocated by an MME, and the identifier is used to obtain the context of the terminal device from the MME. Alternatively, the identifier of the context may be an identifier allocated by the access network device. For example, a resume identifier (resume ID) is an identifier allocated by a base station that communicates with the terminal device last time, and the identifier is sent by the base station that communicates with the terminal device last time to the MME by using a terminal device context suspend request (UE context suspend request).

Figure 5:
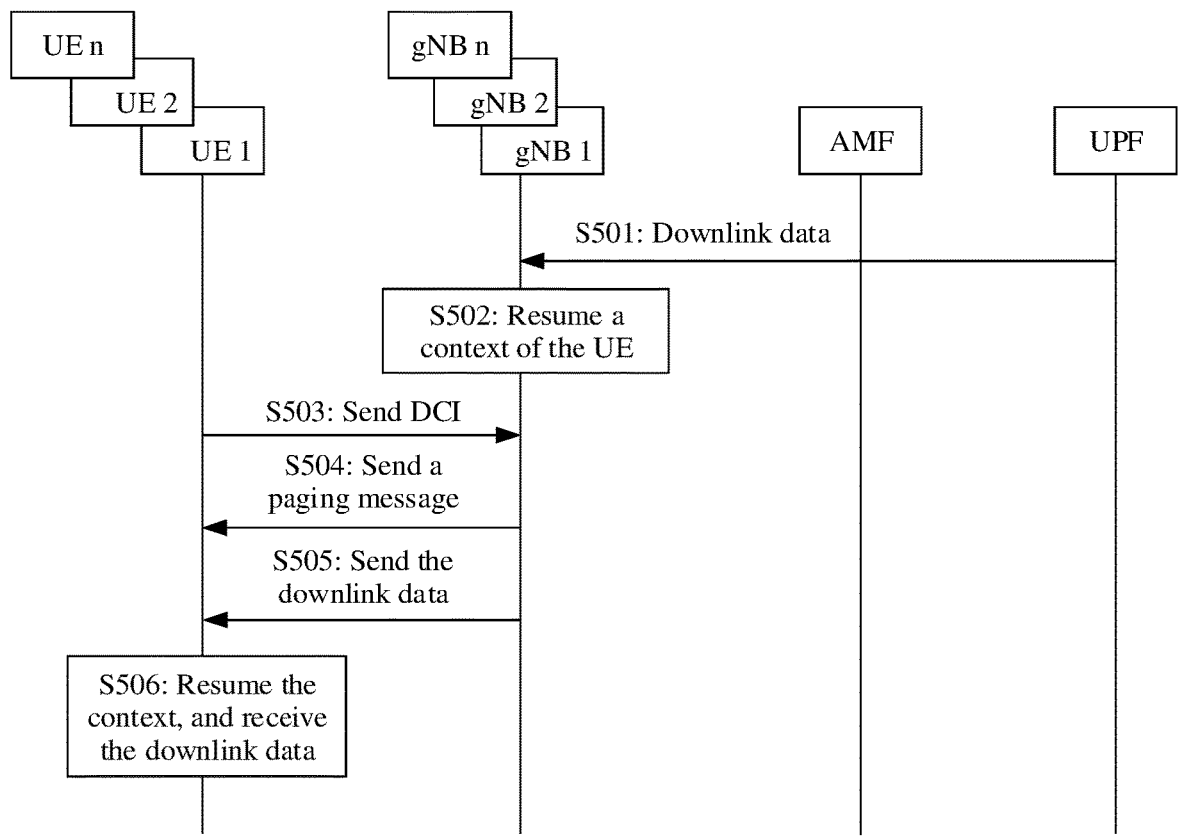
FIG. 5 is a flowchart of interaction in a specific scenario of a first data transmission method according to an embodiment of this application.

For example, with reference to an application scenario shown in FIG. 2B, FIG. 5 shows a specific implementation of the data transmission method provided in this embodiment of this application. This implementation is implemented based on the data transmission method shown in FIG. 3A, and is described below in detail.

Step 501: A UPF sends downlink data for UE to a gNB.

Step 502: When determining that there is the downlink data for the UE to arrive, the gNB resumes a context (UE Context) of the UE.

For example, when determining that there is downlink data for UE 1 to arrive, a gNB 1 actively resumes a context (UE Context) of the UE 1.

Step 503: The gNB sends DCI for scheduling a paging message.

For example, the gNB sends, to the UE 1, the DCI for scheduling the paging message. In a possible implementation, the DCI may include second indication information, and the second indication information indicates that there is the downlink data to arrive. In another possible implementation, the DCI may alternatively include third indication information, and the third indication information indicates a time-frequency location of the downlink data. For details, refer to the possible implementation shown in FIG. 3A. The details are not described herein again.

Step 504: The gNB sends the paging message, where the paging message is used to page the UE, and further includes first indication information, and the first indication information indicates that there is the downlink data for the UE.

For example, the gNB 1 sends the paging message to the UE 1, where the paging message is used to page the UE 1. The paging message carries an identifier of the UE 1. For details, refer to the possible implementation shown in FIG. 3A. The details are not described herein again.

Step 505: The gNB sends the downlink data.

For example, the gNB sends first downlink data to the UE 1. The first downlink data may be carried in an RRC message.

Step 506: The UE 1 receives the paging message; and when determining that there is the downlink data for the UE 1, the UE 1 resumes the context, and receives the downlink data.

For a specific manner of determining the time-frequency location of the downlink data by the UE 1, refer to the possible implementation shown in FIG. 3A. Details are not described herein again.

For example, after the UE 1 receives the paging message, if determining that the paging message includes the identifier of the UE 1 and the first indication information, the UE 1 determines the time-frequency location of the downlink data based on the third indication information in the DCI, and then receives the downlink data on a time-frequency resource.

In conclusion, in this embodiment of this application, no complex RRC connection procedure is required between the terminal device and the access network device. After receiving the DCI and the paging message, the terminal device may receive the downlink data based on the DCI and the paging message, so that the terminal device can receive the downlink data as early as possible. This reduces a time period required for an RRC connection establishment process, so that a service delay is reduced, and user experience is improved. In addition, because the access network device includes the scheduling information for the downlink data in the DCI, in other words, because the scheduling information for the downlink data does not need to be carried in the paging message, a larger quantity of bits in the paging message are used to indicate the paging capacity, so that the paging capacity of the paging message is not reduced.

Embodiment 2

Figure 6A:
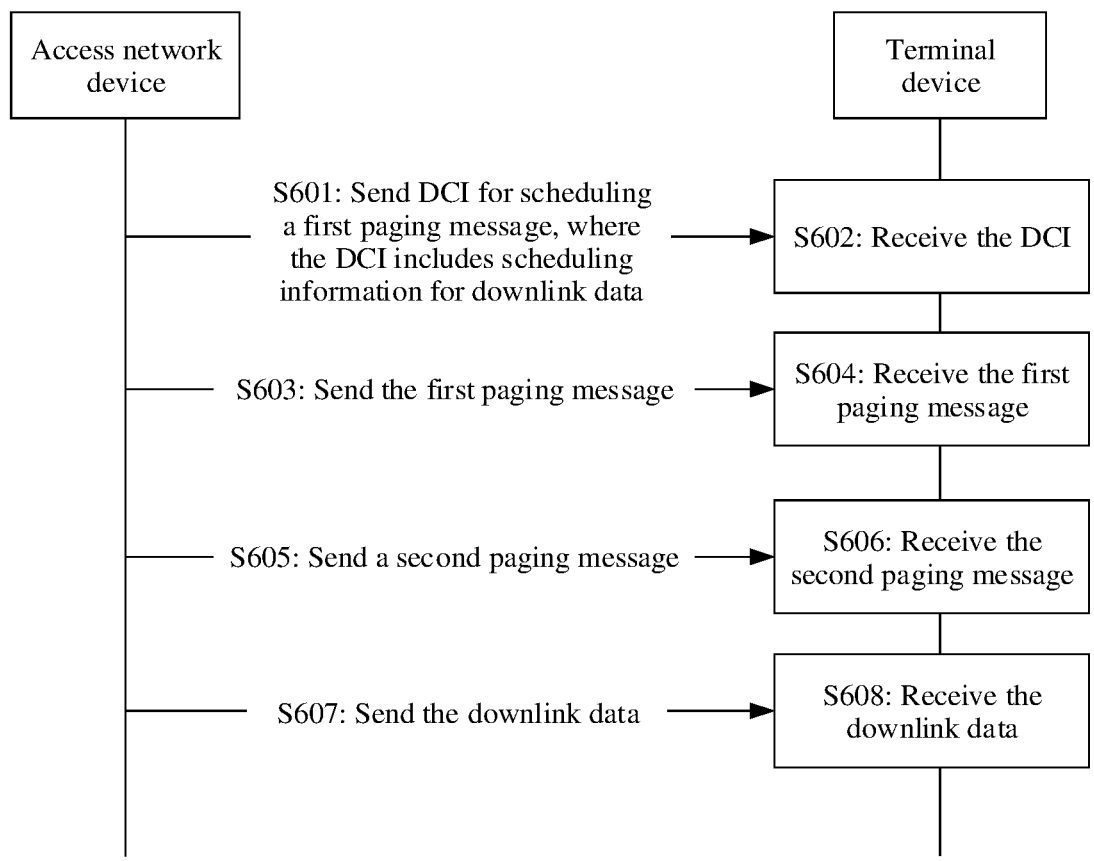
FIG. 6A and FIG. 6B are a flowchart of a data transmission method according to an embodiment of this application.

FIG. 6A is a schematic flowchart of a second data transmission method according to an embodiment of this application. Refer to FIG. 6A. The method includes the following steps.

Step 601: An access network device sends DCI to a first terminal device, where the DCI includes first scheduling information, the first scheduling information is used to schedule a first paging message, and the DCI is further used to schedule downlink data for the first terminal device and a second paging message.

In a possible implementation, the first paging message is used to page a terminal device, so that the terminal device initiates a random access process, to establish an RRC connection to the access network device and perform data transmission.

In a possible implementation, the DCI may be sent by the access network device to a plurality of terminal devices served by the access network device. In other words, all the plurality of terminal devices served by the access network device receive the DCI. Because the DCI includes scheduling information for the downlink data, after receiving the DCI, the terminal device may determine that there may be the downlink data for the terminal device to arrive.

For specific content of the DCI, refer to step 301. Details are not described herein again.

Step 602: The first terminal device receives the DCI.

Specifically, the first terminal device may receive the first paging message based on the first scheduling information in the received DCI. If the first paging message includes an identifier of the first terminal device, the first terminal device determines that the first terminal device is paged by the access network device.

In a possible implementation, if the first terminal device supports the data transmission method, the first terminal device may determine, based on the DCI, whether the DCI includes third indication information. If yes, the first terminal device may determine that the downlink data for the first terminal device may need to be received, and may determine time-frequency locations of the second paging message and the downlink data based on the third indication information.

In another possible implementation, the first terminal device determines, based on the DCI, whether the DCI includes second indication information. If the DCI includes the second indication information, the first terminal device may determine that the downlink data for the first terminal device may need to be received, and may determine third indication information based on the second indication information. The first terminal device may determine time-frequency locations of the second paging message and the downlink data based on the third indication information.

In a possible implementation, if the first terminal device supports the data transmission method, the first terminal device may determine third indication information from the DCI. The first terminal device may determine time-frequency locations of the second paging message and the downlink data based on the third indication information.

Step 603: The access network device sends the first paging message to the first terminal device.

The first paging message does not include the identifier of the first terminal device. For example, the identifier of the terminal device may be an SAE temporary mobile subscriber identity (SAE-temporary mobile subscriber identity, S-TMSI), an identifier for indicating a context of the terminal device, or an I-RNTI (inactive radio network temporary identifier).

Specifically, the first paging message may be sent to the plurality of terminal devices served by the access network device. In other words, all the plurality of terminal devices served by the access network device receive the first paging message. Because the first paging message is used to page the terminal device, the terminal device initiates the random access process after receiving the first paging message, to establish the RRC connection to the access network device and perform data transmission. For example, a base station serves $UE_1$, $UE_2$, . . . , and $UE_M$, and the paging message may be sent to the $UE_1$, the $UE_2$, . . . , and the $UE_M$. In this way, all the $UE_1$, the $UE_2$, . . . , and the $UE_M$ may receive the paging message.

Step 604: The first terminal device receives the first paging message from the access network device.

The first terminal device determines, based on the received first paging message, that the first paging message does not include the identifier of the first terminal device.

Step 605: The access network device sends the second paging message to the first terminal device.

The second paging message includes the identifier of the first terminal device. The first terminal device determines, based on the received second paging message, that the second paging message includes the identifier of the first terminal device. That is, the first terminal device may determine, based on the second paging message, that there is the downlink data. If the second paging message includes only the identifier of the first terminal device, and the DCI includes the third indication information, the identifier and the third indication information are used by the first terminal device to determine that there is the downlink data scheduled using the DCI.

In a first possible implementation, the second paging message further includes identifiers of a plurality of terminal devices in addition to the identifier of the first terminal device.

Figure 6B:
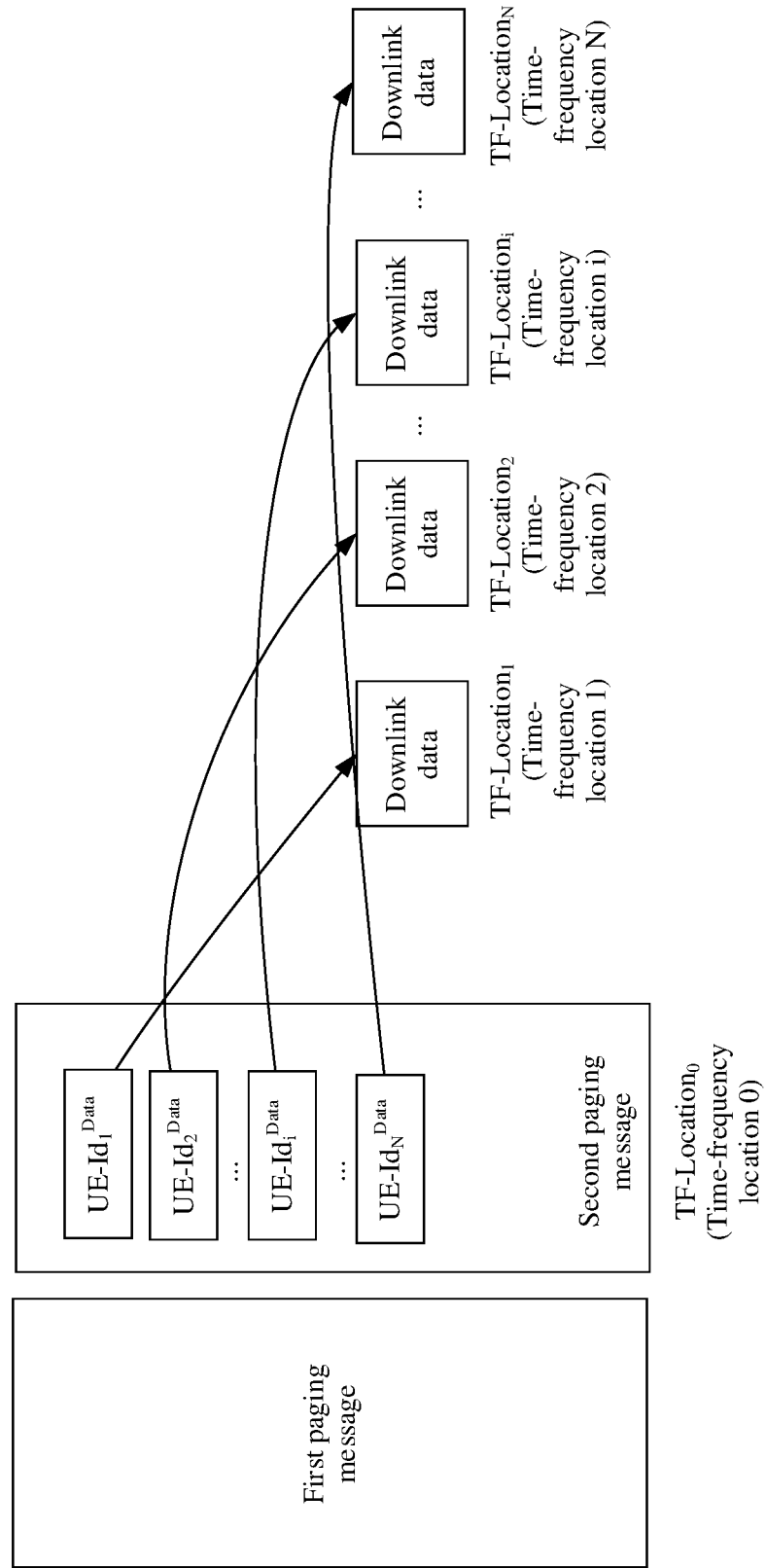

In this implementation, the identifier of the terminal device included in the second paging message may be denoted as $UE\text{-}Id_i$, where a value of i is $\{1, \ldots, M\}$, and M is a positive integer. The identifier of the first terminal device may be denoted as $UE\text{-}Id_j$, the identifiers of the plurality of terminal devices may form an identifier list, and the second paging message includes the identifier list. Refer to FIG. 6B.

In a possible implementation, the first terminal device further receives system information, where the system information includes fifth indication information, and the fifth indication information may indicate: (1) the DCI for scheduling the paging message includes scheduling information for the second paging message and the downlink data; or (2) a current cell or the access network device supports paging DCI-based downlink data transmission.

In a fourth possible implementation, the fifth indication information is used by the first terminal device to determine the time-frequency locations of the second paging message and the downlink data.

In a possible implementation, the first terminal device further receives system information, where the system information includes sixth indication information, and the sixth indication information may indicate time-frequency locations for sending the second paging message and the downlink data.

Step 606: The first terminal device receives the second paging message from the access network device.

Specifically, the first terminal device receives the second paging message based on the first scheduling information, and determines that the second paging message includes the identifier of the first terminal device.

In a possible implementation, if the first terminal device determines that the second paging message includes only the identifier of the first terminal device and that the DCI includes the third indication information, the first terminal device determines the time-frequency location of the downlink data based on the third indication information.

In a possible implementation, the first terminal device determines that the second paging message includes one or more identifiers identifiers of one or more terminal devices, where the one or more terminal devices include the first terminal device. If the first terminal device determines that the second paging message includes the identifier of the first terminal device and that the DCI includes the third indication information, the first terminal device determines the time-frequency location J of the downlink data for the first terminal device based on the third indication information and a position J of the identifier of the first terminal device in the second paging message.

In step 604, when the first terminal device determines that the first paging message does not include the identifier of the first terminal device, if the first terminal device supports a method for scheduling downlink data based on paging DCI, and the DCI includes the second indication information or the third indication information, the first terminal device receives the second paging message.

The first terminal device determines, based on the second paging message, whether the second paging message includes the identifier of the first terminal device. If the second paging message includes the identifier of the first terminal device, the first terminal device determines that there is the downlink data corresponding to the first terminal device.

Step 607: The access network device sends the downlink data to the first terminal device.

In a possible implementation, the downlink data is carried in RRC signaling.

In a possible implementation, the access network device sends the downlink data only to the first terminal device.

In a possible implementation, in addition to sending the downlink data to the first terminal device, the access network device further sends downlink data to another terminal device. The downlink data one-to-one corresponds to the terminal device. In this implementation, the access network device sends an $i^{th}$ piece of downlink data to an $i^{th}$ terminal device that corresponds to an $i^{th}$ terminal device identifier in the second paging message and at which downlink data is to arrive, where a value of i is $\{1, \ldots, N\}$, and N is a quantity of pieces of downlink data. The $i^{th}$ piece of downlink data one-to-one corresponds to the identifier, in the second paging message, of the $i^{th}$ terminal device at which the downlink data is to arrive, as shown in FIG. 6B.

Step 608: The terminal device receives the downlink data from the access network device.

In step 608, if the first terminal device determines that there is the downlink data corresponding to the first terminal device, the first terminal device receives the downlink data based on the third indication information.

Specifically, in a possible implementation, if the access network device sends the downlink data only to the first terminal device, the first terminal device receives the downlink data from the access network device at the time-frequency location that is of the downlink data and that is determined based on the third indication information in step 604.

Specifically, in a possible implementation, in addition to sending the downlink data to the first terminal device, the access network device further sends downlink data to another terminal device. The first terminal device receives data on a $J^{th}$ downlink data transport block from the access network device based on the third indication information and the position J, in the identifier list, of the identifier of the first terminal device at which the downlink data is to arrive.

In a possible implementation, the method may further include step 600: The access network device sends the system information to the terminal device, where the system information includes fourth indication information, and the fourth indication information indicates the time-frequency location of the downlink data. In this way, when determining, based on the identifier of the paged terminal device in the second paging message, that there is the downlink data, the terminal device may alternatively determine the time-frequency location of the downlink data based on the fourth indication information in the system information, and then receive the downlink data at the time-frequency location.

It can be learned from the foregoing technical solution that the access network device may send the downlink data to the terminal device after sending the paging message, so that the terminal device can receive the downlink data as early as possible. The downlink data can be transmitted in advance through a simplified signaling or data exchange process, so that resource utilization can be improved, and power consumption of the terminal can be reduced. In addition, the paging message does not carry the downlink data or the scheduling information for the downlink data, so that a larger quantity of bits in the paging message are used to indicate a paging capacity, load of the paging message can be reduced, and the paging capacity of the paging message is not reduced.

The following further describes various manners of indicating the time-frequency locations of the second paging message and the downlink data in the embodiment shown in FIG. 6A.

Case 1: The first paging message does not include the identifier of the first terminal device, and the second paging message includes only the identifier of the first terminal device.

Manner 1: That the third indication information may indicate the time-frequency locations for sending the second paging message and the downlink data includes: The third indication information includes a data frequency-domain resource indicator (Frequency domain resource assignment-Data) and/or a data time-domain resource indicator (Time domain resource assignment-Data), where the data frequency-domain resource indicator indicates a frequency-domain location for sending the second paging message and/or a frequency-domain location for sending the downlink data, and the data time-domain resource indicator indicates a time-domain location for sending the second paging message and/or a time-domain location for sending the downlink data.

For a specific example, refer to the description corresponding to Table 3. Details are not described herein again.

Figure 7A:
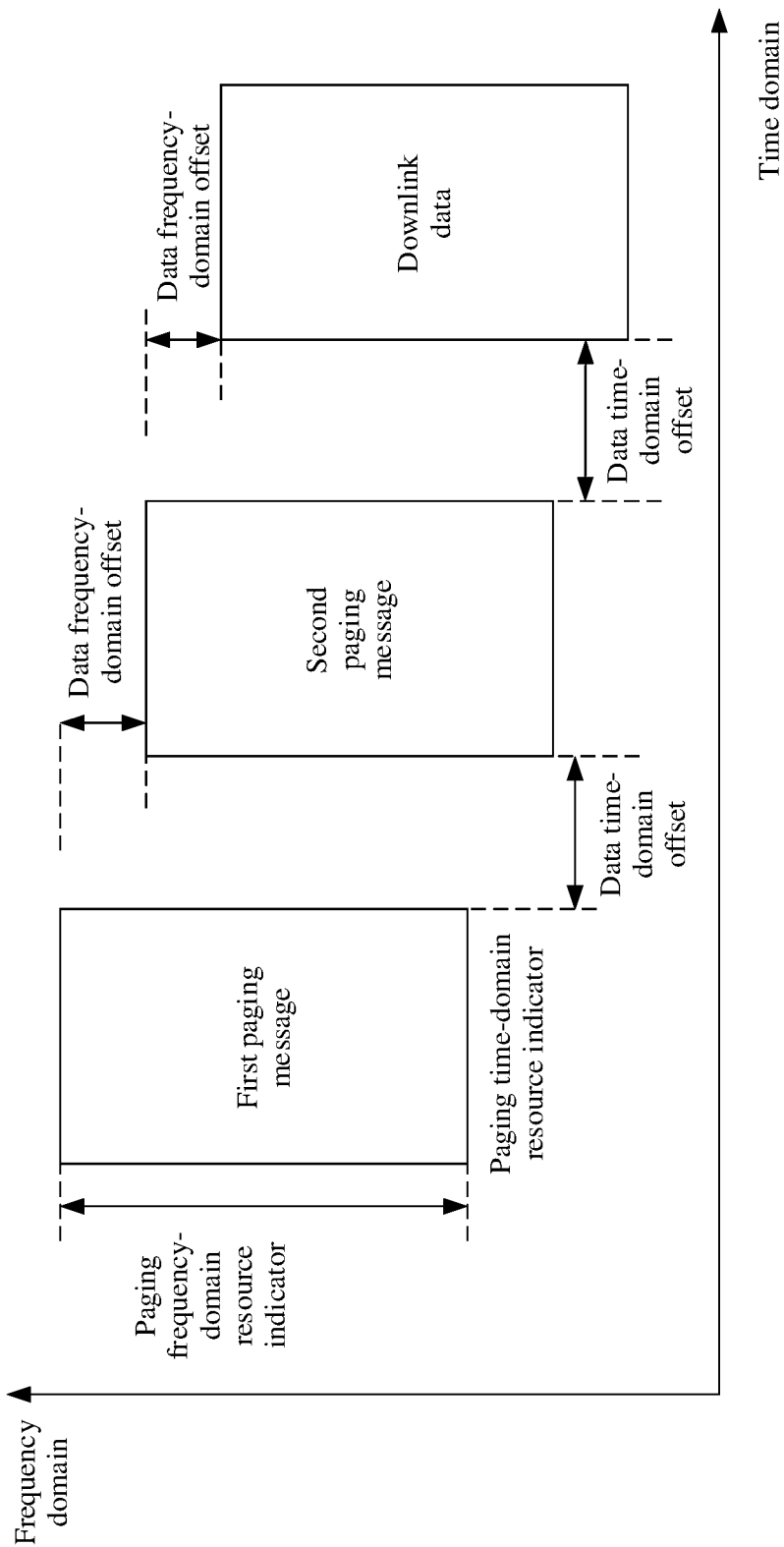
FIG. 7A and FIG. 7B each are a schematic diagram of another offset according to an embodiment of this application.

Manner 2: The third indication information may include a data frequency-domain offset (Frequency domain Offset-Data) and/or a data time-domain offset (Time domain Offset-Data), the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message, as shown in FIG. 7A.

Figure 7B:
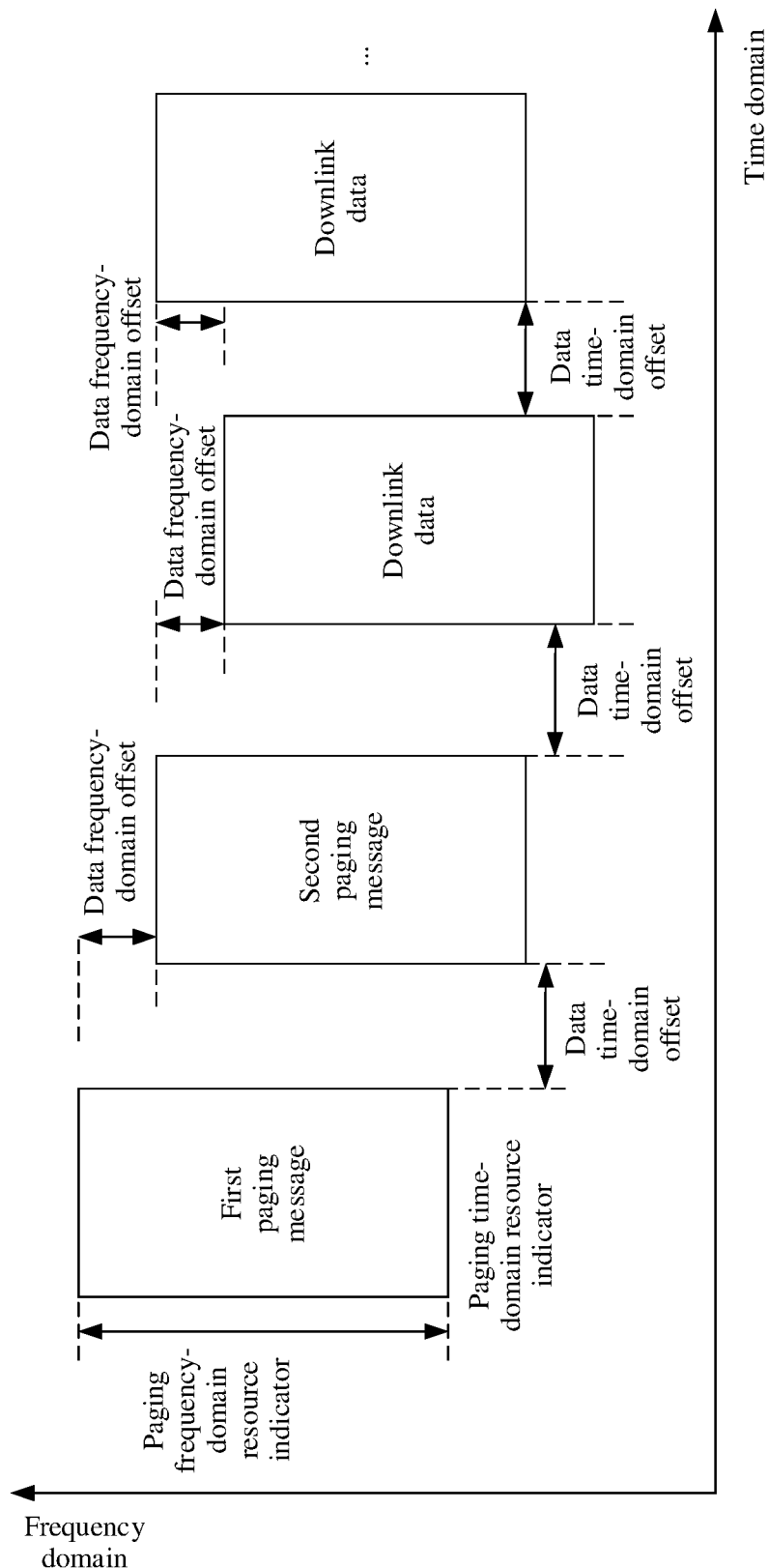

As shown in FIG. 7B, when a plurality of pieces of downlink data are scheduled, the data frequency-domain offset is further used to indicate an offset of a frequency-domain location for sending a previous piece of downlink data relative to the frequency-domain location for sending the current piece of downlink data, and the data time-domain offset is further used to indicate an offset of a time-domain location for sending the previous piece of downlink data relative to the time-domain location for sending the current piece of downlink data.

Manner 3: That the third indication information may indicate the time-frequency location for sending the downlink data includes: The third indication information includes a data frequency-domain resource indicator (Frequency domain resource assignment-Data) and a data time-domain offset (Time domain Offset-Data).

Manner 4: That the third indication information may indicate the time-frequency location for sending the downlink data includes: The third indication information includes a data time-domain resource indicator (Time domain resource assignment-Data) and a data frequency-domain offset (Frequency domain Offset-Data).

Manner 5: That the third indication information may indicate the time-frequency location for sending the downlink data includes: The third indication information indicates that the time-frequency location for sending the downlink data is a time-frequency location, indicated by the system information, for sending the downlink data.

Manner 6: That the third indication information may indicate the time-frequency location for sending the downlink data includes: The third indication information includes a data frequency-domain offset (Frequency domain Offset-Data) and/or a data time-domain offset (Time domain Offset-Data), where the data frequency-domain offset indicates an offset of a frequency-domain location for sending the downlink data relative to a frequency-domain location, indicated by the system information, for sending the downlink data, and the data time-domain offset indicates an offset of a time-domain location for sending the downlink data relative to a time-domain location, indicated by the system information, for sending the downlink data.

If the third indication information does not include the data frequency-domain offset, a data frequency-domain resource indicator indicated by the system information indicates the frequency-domain location for sending the downlink data. If the third indication information does not include the data time-domain offset, a data time-domain resource indicator indicated by the system information indicates the time-domain location for sending the downlink data.

Case 2: The first paging message does not include the identifier of the first terminal device, and the second paging message further includes an identifier of another terminal device in addition to the identifier of the first terminal device. An identifier of at least one terminal device one-to-one corresponds to at least one downlink data transport block.

Manner 1: That the third indication information may indicate the time-frequency location for sending the downlink data includes: The third indication information includes a time-frequency resource indicator list, where the time-frequency resource indicator list includes data frequency-domain resource indicators and data time-domain resource indicators of downlink data for N UEs and the second paging message. For example, the time-frequency resource indicator list is shown by content in the bold box in Table 5, and is in a list form. There are N+1 pieces of Frequency domain resource assignment-Data (data frequency-domain resource indicators) and N+1 pieces of Time domain resource assignment-Data (data time-domain resource indicators) following a paging time-domain resource indicator (Time domain resource assignment), where a $J^{th}$ piece of Frequency domain resource assignment-Data and a $J^{th}$ piece of Time domain resource assignment-Data are used to indicate the time-frequency location of the downlink data for the first terminal device. The data frequency-domain resource indicators and the data time-domain resource indicators in the foregoing time-frequency resource indicator list are numbered from 0, where a data frequency-domain resource indicator and a data time-domain resource indicator that are numbered 0 indicate the time-frequency location of the second paging message.

For a specific example, refer to the description corresponding to Table 5. Details are not described herein again.

Manner 2: That the third indication information may indicate the time-frequency locations for sending the second paging message and the downlink data includes: The third indication information includes a data frequency-domain offset (Frequency domain Offset-Data) and/or a data time-domain offset (Time domain Offset-Data), the data frequency-domain offset indicates an offset of a frequency-domain location for sending the second paging message relative to a frequency-domain location for sending the first paging message and an offset of a frequency-domain location for sending the downlink data relative to the frequency-domain location of a resource for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

For a specific example, refer to the description corresponding to Table 6, Table 7, and the manner 2 in the foregoing case 1. Details are not described herein again.

Manner 3: That the third indication information may indicate the time-frequency locations for sending the second paging message and the downlink data includes: The third indication information includes a data frequency-domain resource indicator (Frequency domain resource assignment-Data) and a data time-domain offset (Time domain Offset-Data).

Manner 4: That the third indication information may indicate the time-frequency locations for sending the second paging message and the downlink data includes: The third indication information includes a data time-domain resource indicator (Time domain resource assignment-Data) and a data frequency-domain offset (Frequency domain Offset-Data).

Manner 5: That the third indication information may indicate the time-frequency locations for sending the second paging message and the downlink data includes: The third indication information indicates that the time-frequency locations for sending the second paging message and the downlink data are time-frequency locations, indicated by the system information, for sending the second paging message and the downlink data.

Manner 6: That the third indication information may indicate the time-frequency locations for sending the second paging message and the downlink data includes: The third indication information includes a data frequency-domain offset (Frequency domain Offset-Data) and/or a data time-domain offset (Time domain Offset-Data), where the data frequency-domain offset indicates offsets of frequency-domain locations for sending the second paging message and the downlink data relative to frequency-domain locations, indicated by the system information, for sending the second paging message and the downlink data, and the data time-domain offset indicates offsets of time-domain locations for sending the second paging message and the downlink data relative to time-domain locations, indicated by the system information, for sending the second paging message and the downlink data.

If the third indication information does not include the data frequency-domain offset, a data frequency-domain resource indicator indicated by the system information indicates the frequency-domain locations for sending the second paging message and the downlink data. If the third indication information does not include the data time-domain offset, a data time-domain resource indicator indicated by the system information indicates the time-domain locations for sending the second paging message and the downlink data.

For example, the system information includes fourth indication information. The fourth indication information indicates frequency-domain resource assignment (Frequency domain resource assignment-Data) for sending downlink data for the $1^{st}$ terminal device and/or time-domain resource assignment (Time domain resource assignment-Data) for sending the downlink data, and the third indication information includes a data frequency-domain offset (Frequency domain Offset-Data) and/or a data time-domain offset (Time domain Offset-Data). A time-frequency location for sending the downlink data for the $1^{st}$ terminal device that is in the identifier list in the paging message and at which the downlink data is to arrive may be determined based on the fourth indication information. A time-frequency location for sending downlink data for a terminal device other than the $1^{st}$ terminal device may be determined based on the fourth indication information and the third indication information.

For different information indicated in the fourth indication information, refer to the manner of determining the time-frequency location of the downlink data in the foregoing case 1, and details are not described herein again. Because the DCI may carry a limited quantity of bits, the method may help further reduce information carried in the DCI, to reduce load of the DCI as much as possible.

In conclusion, in this embodiment of this application, it can be learned from the foregoing technical solution that the access network device may send the downlink data to the terminal device after sending the paging message, so that the terminal device can receive the downlink data as early as possible. The downlink data can be transmitted in advance through a simplified signaling or data exchange process, so that resource utilization can be improved, and power consumption of the terminal device can be reduced. In addition, in this embodiment, the paging message does not carry the downlink data or the scheduling information for the downlink data, so that the paging capacity is not reduced.

Figure 8:
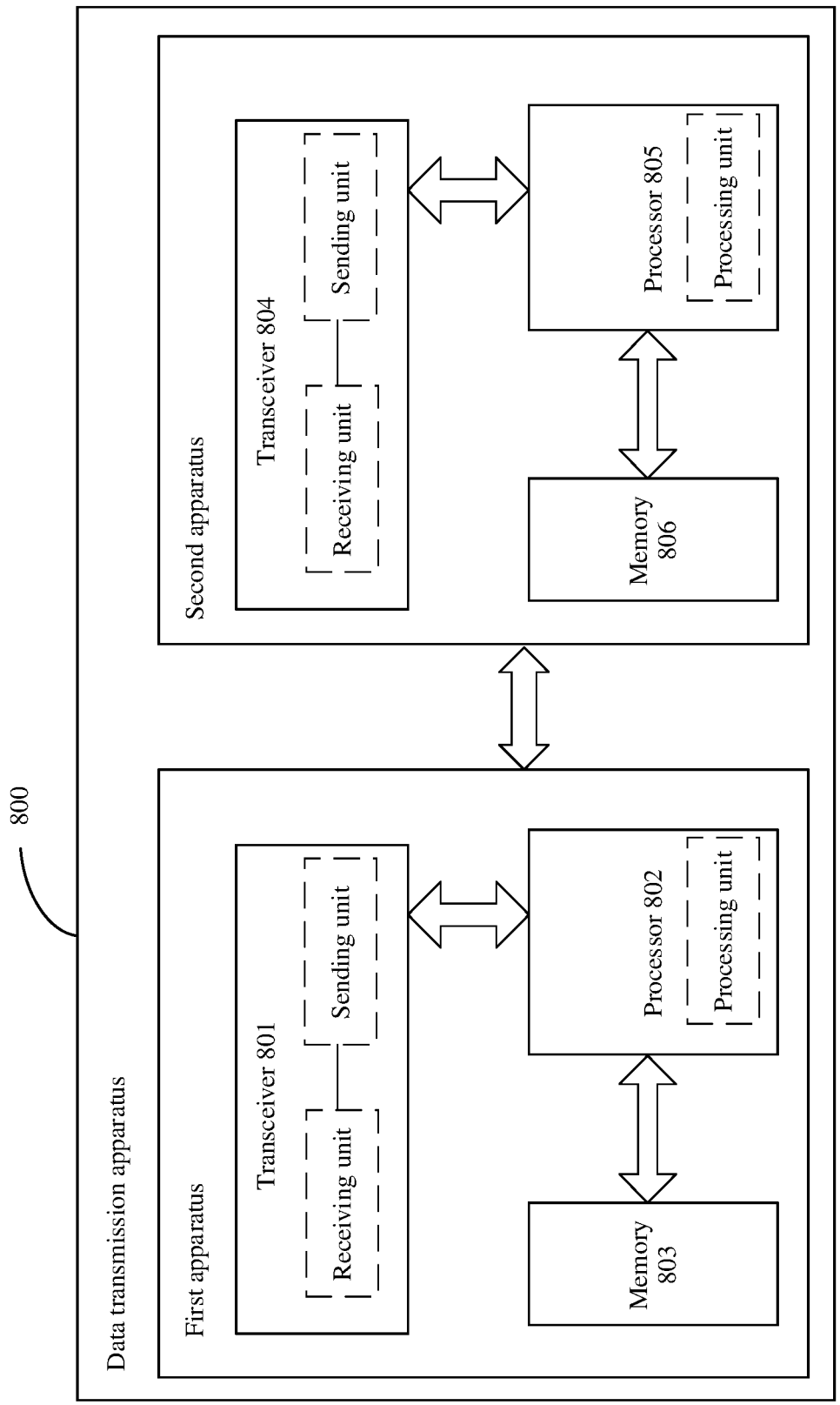
FIG. 8 is a first schematic diagram of a structure of a data transmission apparatus according to an embodiment of this application.

Based on the same inventive concept as the foregoing method embodiments, as shown in FIG. 8, an embodiment of this application further provides a data transmission apparatus 800. The data transmission apparatus 800 is configured to implement operations performed by the access network device and the terminal device in the foregoing embodiments. For brief illustration, schematic diagrams of possible apparatuses for the access network device and the terminal device are illustrated with reference to FIG. 8. It may be understood that FIG. 8 is merely a schematic diagram, and may be used in the foregoing access network device and terminal device. A first communication apparatus in the data transmission apparatus 800 includes a transceiver 80$i$, a processor 802, and a memory 803, and a second communication apparatus includes a transceiver 804, a processor 805, and a memory 806. The memory 803 and the processor 802 may be coupled and integrated into one chip, or may be separately integrated into different chips. The memory 806 and the processor 805 may be coupled and integrated into one chip, or may be separately integrated into different chips.

For the first communication apparatus, the processor 802 is configured to call a set of programs. When the programs are executed, the processor 802 is enabled to perform the operations performed by the access network device in the data transmission method provided in the embodiment shown in FIG. 3A or FIG. 6A. The memory 803 is configured to store the programs executed by the processor 802. The transceiver 801 may be considered as a transceiver unit of the access network device, and is configured to support the access network device to perform a receiving function and a sending function in the method embodiment shown in FIG. 3A or FIG. 6A. The processor 802 may be considered as a processing unit of the access network device. Optionally, a component configured to implement the receiving function in the transceiver unit may be considered as a receiving unit, and a component configured to implement the sending function in the transceiver unit may be considered as a sending unit. In other words, the transceiver unit includes the receiving unit and the sending unit. The receiving unit may also be referred to as a receiver, an input port, a receiver circuit, or the like. The sending unit may be referred to as a transmitter, a transmitter circuit, or the like.

For the second communication apparatus, the processor 805 is configured to call a set of programs. When the programs are executed, the processor 805 is enabled to perform the operations performed by the terminal device in the data transmission method provided in the embodiment shown in FIG. 3A or FIG. 6A. The memory 806 is configured to store the programs executed by the processor 805. The transceiver 804 may be considered as a transceiver unit of the terminal device, and is configured to support the terminal device to perform a receiving function and a sending function in the foregoing method embodiment. The processor 802 may be considered as a processing unit of the terminal device. Optionally, a component configured to implement the receiving function in the transceiver unit may be considered as a receiving unit, and a component configured to implement the sending function in the transceiver unit may be considered as a sending unit. In other words, the transceiver unit includes the receiving unit and the sending unit. The receiving unit may also be referred to as a receiver, an input port, a receiver circuit, or the like. The sending unit may be referred to as a transmitter, a transmitter circuit, or the like.

Figure 9:
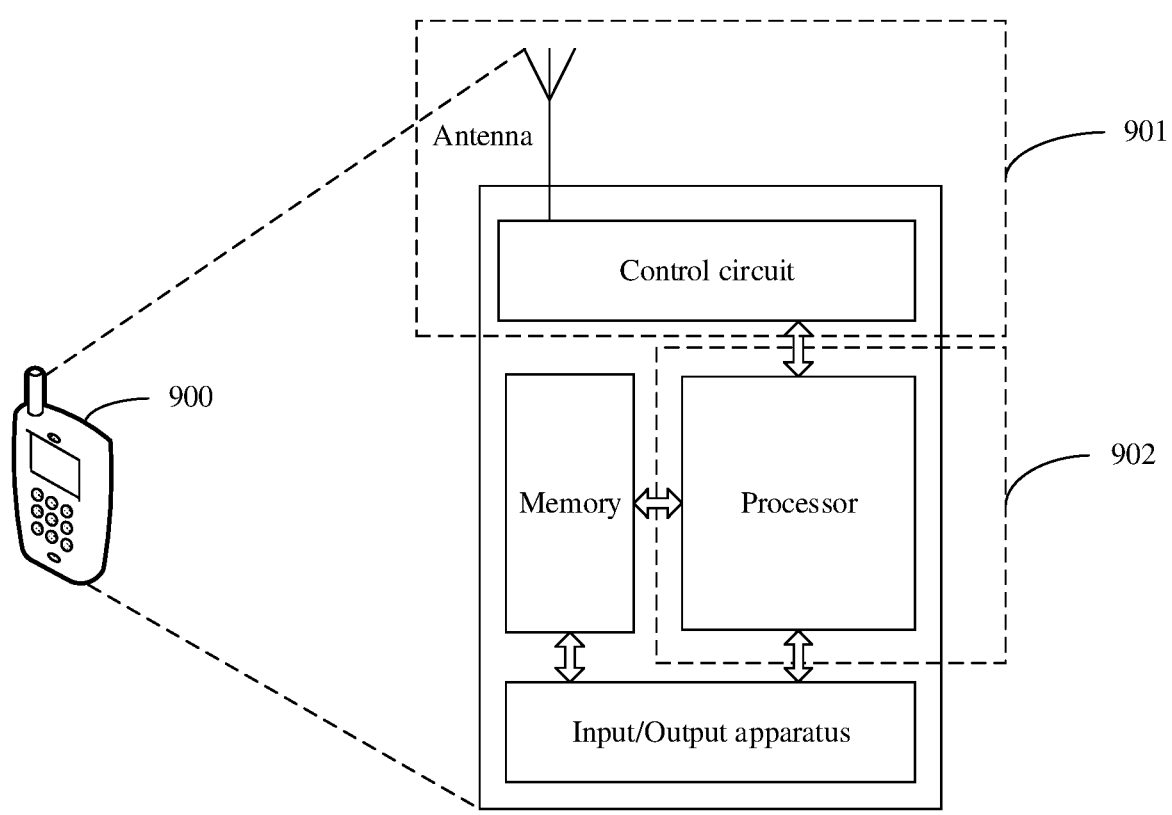
FIG. 9 is a second schematic diagram of a structure of a data transmission apparatus according to an embodiment of this application.

Based on the same inventive concept, as shown in FIG. 9, an embodiment of this application provides a data transmission apparatus 900. The data transmission apparatus 900 may be used in the communication system shown in FIG. 2A or FIG. 2B, and perform functions of the terminal device in the foregoing method embodiments. For ease of description, FIG. 9 shows only main components of the terminal. As shown in FIG. 9, the terminal device 900 includes a processor, a memory, a control circuit, an antenna, and an input/output apparatus. The processor is mainly configured to process a communication protocol and communication data, control the entire terminal, execute a software program, and process data of the software program. For example, the processor is configured to support the terminal to perform actions described in the foregoing method embodiments, for example, determine a time-frequency location of downlink data. The memory is mainly configured to store the software program and data, for example, store the DCI, the downlink data, and the like described in the foregoing embodiments. The control circuit is mainly configured to perform conversion between a baseband signal and a radio frequency signal, and process the radio frequency signal. A combination of the control circuit and the antenna may also be referred to as a transceiver, mainly configured to send/receive a radio frequency signal in an electromagnetic wave form. The input/output apparatus, for example, a touchscreen, a display, or a keyboard, is mainly configured to receive data entered by a user and output data to the user.

After the terminal device is powered on, the processor may read the software program in a storage unit, interpret and execute instructions of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in the electromagnetic wave form through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

Persons skilled in the art may understand that for ease of description, FIG. 9 shows only one memory and only one processor. In an actual terminal, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communication protocol and the communications data. The central processing unit is mainly configured to control the entire terminal, execute the software program, and process the data of the software program. The processor in FIG. 9 may integrate functions of the baseband processor and the central processing unit. Persons skilled in the art may understand that the baseband processor and the central processing unit may alternatively be processors independent of each other, and are interconnected by using a technology such as a bus. Persons skilled in the art may understand that the terminal may include a plurality of baseband processors to adapt to different network standards, and the terminal may include a plurality of central processing units to enhance a processing capability of the terminal. All the components of the terminal may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a software program form, where the processor executes a software program to implement a baseband processing function.

In this embodiment of this application, the antenna and the control circuit that have a transceiver function may be considered as a transceiver unit 901 of the terminal 900, for example, to support the terminal to perform a receiving function and a sending function in the foregoing method embodiments. The processor having a processing function is considered as a processing unit 902 of the terminal device 900. As shown in FIG. 9, the terminal 900 includes the transceiver unit 901 and the processing unit 902. The transceiver unit may also be referred to as a transceiver, a transceiver apparatus, or the like. Optionally, a component configured to implement the receiving function in the transceiver unit 901 may be considered as a receiving unit, and a component configured to implement the sending function in the transceiver unit 901 may be considered as a sending unit. In other words, the transceiver unit 901 includes the receiving unit and the sending unit. The receiving unit may also be referred to as a receiver, an input port, a receiver circuit, or the like. The sending unit may be referred to as a transmitter, a transmitter circuit, or the like.

The processor 902 may be configured to execute the instructions stored in the memory, to control the transceiver unit 901 to receive a signal and/or send a signal, to complete functions of the terminal in the foregoing method embodiments. In an implementation, it may be considered to implement a function of the transceiver unit 901 by using a transceiver circuit or a dedicated transceiver chip.

Figure 10:
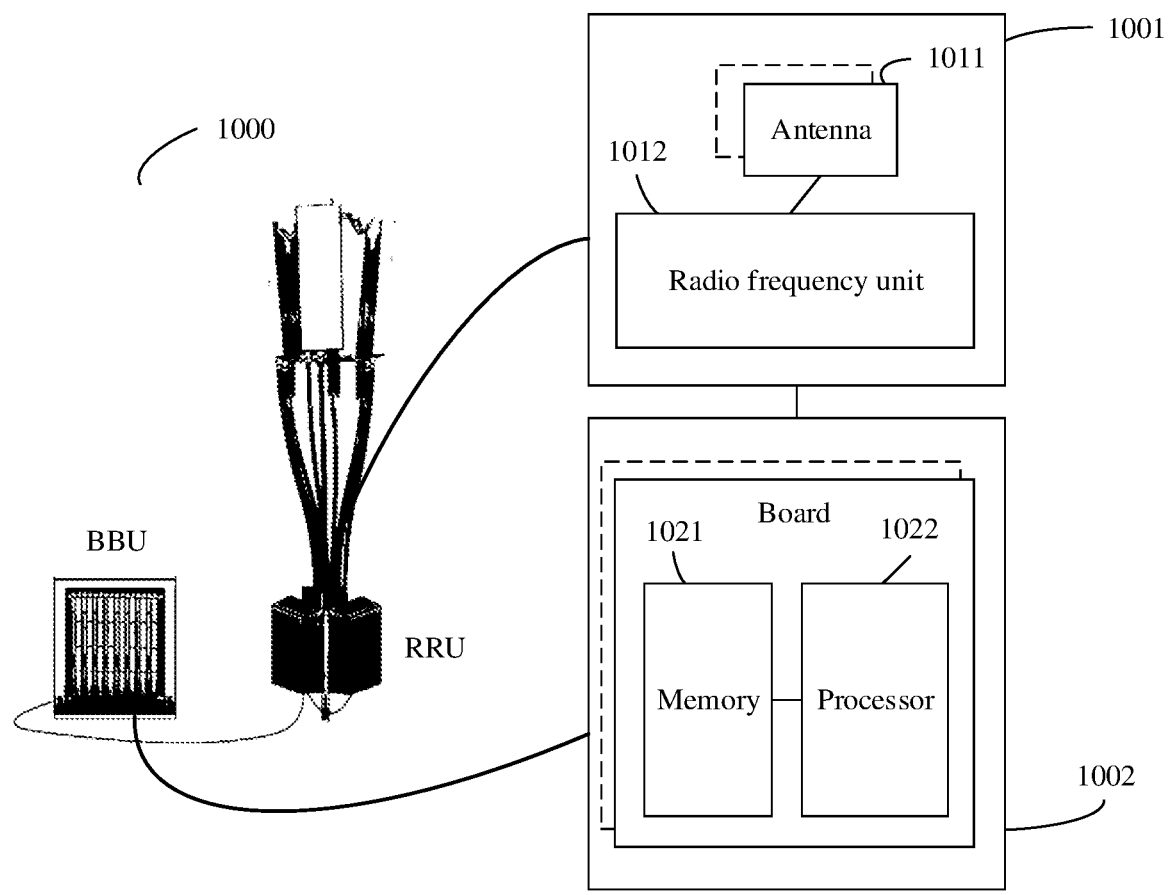
FIG. 10 is a third schematic diagram of a structure of a data transmission apparatus according to an embodiment of this application.

FIG. 10 is a schematic diagram of a structure of a data transmission apparatus according to an embodiment of this application, and for example, may be a schematic diagram of a structure of an access network device (namely, a base station). As shown in FIG. 10, the access network device may be used in the system shown in FIG. 2A and FIG. 2B, and perform functions of a first network device in the foregoing method embodiments. A network device 1000 (which may also be referred to as a base station 1000) may include one or more radio frequency units, such as a remote radio unit (remote radio unit, RRU) 1001 and one or more baseband units (baseband units, BBUs) (which may also be referred to as digital units (digital units, DUs)) 1002. The RRU 1001 may be referred to as a transceiver unit, a transceiver, a transceiver circuit, or the like, and may include at least one antenna 1011 and a radio frequency unit 1012. The RRU 1001 is mainly configured to send and receive a radio frequency signal, and perform conversion between the radio frequency signal and a baseband signal. For example, the RRU 1001 is configured to send DCI or a paging message, or send downlink data to a terminal. The BBU 1002 is mainly configured to: perform baseband processing, control the base station, and so on. The RRU 1001 and the BBU 1002 may be physically disposed together; or may be physically separately disposed, that is, in a distributed base station.

The BBU 1002, also referred to as a processing unit, is a control center of the base station, and is mainly configured to implement baseband processing functions such as channel coding, multiplexing, modulation, and spectrum spreading. For example, the BBU (the processing unit) 1002 may be configured to control the base station to perform an operation procedure related to the first network device in the foregoing method embodiments.

In an example, the BBU 1002 may include one or more boards. A plurality of boards may jointly support a radio access network (for example, an LTE network) of a single access standard, or may separately support radio access networks (such as an LTE network, a 12G network, or another network) of different access standards. The BBU 1002 further includes a memory 1021 and a processor 1022. The memory 1021 is configured to store necessary instructions and data. For example, the memory 1021 stores a correspondence between a codebook index and a precoding matrix in the foregoing embodiments. The processor 1022 is configured to control the base station to perform necessary actions, for example, configured to control the base station to perform the operation procedure related to the first network device in the foregoing method embodiments. The memory 1021 and the processor 1022 may serve one or more boards. In other words, a memory and a processor may be disposed on each board. Alternatively, a plurality of boards may share a same memory and a same processor. In addition, a necessary circuit may be further disposed on each board.

This application further provides a communication system, including the foregoing one or more network devices and one or more terminals.

It should be noted that the processor in embodiments of this application may be an integrated circuit chip, and has a signal processing capability. In an implementation process, the steps in the foregoing method embodiments may be completed by using a hardware integrated logic circuit in the processor or instructions in a form of software. The processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that, in embodiments of this application, the memory may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any other memory of an appropriate type.

An embodiment of this application further provides a computer-readable medium. The computer-readable medium stores a computer program. When the computer program is executed by a computer, the method in any method embodiment is implemented.

An embodiment of this application further provides a computer program product. When the computer program product is executed by a computer, the method in any method embodiment is implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (Digital Video Disc, DVD)), a semiconductor medium (for example, a solid-state drive (Solid-State Drive, SSD)), or the like.

An embodiment of this application further provides a processing apparatus, including a processor and an interface. The processor is configured to perform the communication method in any one of the foregoing method embodiments.

It should be understood that the processing apparatus may be a chip. The processor may be implemented by using hardware, or may be implemented by using software. When implemented by using the hardware, the processor may be a logic circuit, an integrated circuit, or the like. When implemented by using the software, the processor may be a general purpose processor. The general purpose processor is implemented by reading software code stored in a memory. The memory may be integrated into the processor, may be located outside the processor, or may exist independently.

It should be understood that "one embodiment" or "an embodiment" in this specification means that particular features, structures, or characteristics related to embodiments are included in at least one embodiment of this application. Therefore, "in one embodiment" or "in an embodiment" appearing in this specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

Persons skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some preferred embodiments of this application have been described, persons skilled in the art can make other changes and modifications to these embodiments once they learn of the basic inventive concept. Therefore, the following claims are intended to be construed as to cover preferred embodiments and all changes and modifications falling within the scope of this application.

Clearly, persons skilled in the art can make various modifications and variations to embodiments of this application without departing from the spirit and scope of embodiments of this application. In this way, this application is intended to cover these modifications and variations of embodiments of this application provided that they fall within the scope defined by the following claims and their equivalent technologies.

What is claimed is:

1. A data transmission method, wherein the method is applicable to a first terminal device, and comprises:
   receiving downlink control information (DCI) from an access network device, wherein the DCI comprises information to schedule a paging message and to schedule downlink data, the DCI further comprising at least one bit indicating that there is first downlink data to be sent to the first terminal device;
   receiving the paging message from the access network device, wherein the paging message comprises a paging record list and first indication information, and the first indication information indicates that there is the first downlink data corresponding to the first terminal device to be sent, the first indication information comprising:
      a list of indication information corresponding to the paging record list, wherein a value of True in the list of indication information corresponds to an identifier of a terminal device in the paging record list and indicates that there is downlink data for the terminal device, or
      a quantity X of identifiers of terminal devices at which the downlink data is to arrive; and
   in response to determining, based on the DCI, the paging record list, and the first indication information, that there is the first downlink data corresponding to the first terminal device, receiving the first downlink data from the access network device.

2. The method according to claim 1, wherein the at least one bit of the DCI comprises second indication information, and the second indication information comprises one bit of a short messages field of the DCI or one bit of a reserved field of the DCI, wherein the one bit of the short messages field of the DCI or the one bit of the reserved field of the DCI indicates that there is the first downlink data to be sent to the first terminal device.

3. The method according to claim 1, wherein the DCI further comprises third indication information, the third indication information comprises a data frequency-domain offset or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

4. The method according to claim 1, further comprising:
   receiving system information from the access network device, wherein the system information indicates a time-frequency location of the first downlink data.

5. The method according to claim 4, wherein the system information comprises fourth indication information, the fourth indication information comprises a data frequency-domain offset or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

6. The method according to claim 1, wherein the first indication information comprises a quantity N of downlink data transport blocks.

7. The method according to claim 1, wherein the first indication information comprises at least one piece of indication information, and the at least one piece of indication information one-to-one corresponds to an identifier of at least one terminal device in the paging message.

8. A data transmission method, wherein the method is applicable to a first terminal device, and comprises:
   receiving downlink control information (DCI) from an access network device, wherein the DCI comprises information to schedule a first paging message to schedule first downlink data for the first terminal device, and to schedule a second paging message;
   receiving the second paging message from the access network device, wherein the second paging message comprises an identifier of the first terminal device, wherein the first terminal device determines based on the identifier in the second paging message that there is the first downlink data for the first terminal device, and the second paging message further comprises a paging record list and first indication information, the first indication information comprising:
      a list of indication information corresponding to the paging record list, the paging record list comprising the identifier of the first terminal device, wherein a value of True in the list of indication information corresponding to an identifier of a terminal device in the paging record list indicates that there is downlink data for the terminal device, or a quantity X of identifiers of terminal devices at which the downlink data is to arrive; and in response to determining, based on the DCI, the paging record list, and the first indication information, that there is the first downlink data corresponding to the first terminal device, receiving the first downlink data from the access network device.

9. The method according to claim 8, wherein scheduling information in the DCI comprises second indication information, and the second indication information comprises one bit of a short messages field of the DCI or one bit of a reserved field of the DCI, wherein the one bit of the short messages field of the DCI or the one bit of the reserved field of the DCI indicates that there is the first downlink data to be sent to the first terminal device.

10. The method according to claim 8, wherein the DCI further comprises third indication information, the third indication information comprises a data frequency-domain offset or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

11. The method according to claim 8, further comprising:
receiving system information from the access network device, wherein the system information indicates a time-frequency location of the first downlink data or the second paging message.

12. The method according to claim 11, wherein the system information comprises fourth indication information, the fourth indication information comprises a data frequency-domain offset or a data time-domain offset, the data frequency-domain offset indicates an offset of a frequency-domain location for sending the second paging message relative to a frequency-domain location for sending the first paging message and an offset of a frequency-domain location for sending the downlink data relative to the frequency-domain location for sending the second paging message, and the data time-domain offset indicates an offset of a time-domain location for sending the second paging message relative to a time-domain location for sending the first paging message and an offset of a time-domain location for sending the downlink data relative to the time-domain location for sending the second paging message.

13. The method according to claim 8, wherein the second paging message comprises an identifier of at least one terminal device, and the identifier of the at least one terminal device one-to-one corresponds to at least one downlink data transport block.

14. A communication apparatus, comprising
a receiver;
at least one processor; and
one or more memories coupled to the at least one processor and storing programming instructions for execution by the at least one processor to cause the apparatus to:

receive downlink control information (DCI) from an access network device through a communication interface, wherein the DCI comprises information to schedule a paging message, and to schedule downlink data, the DCI further comprising at least one bit indicating that there is first downlink data to be sent to a first terminal device;

receive the paging message from the access network device through the communication interface, wherein the paging message comprises a paging record list and first indication information, and the first indication information indicates there is the first downlink data corresponding to the apparatus to be sent, the first indication information comprising:

a list of indication information corresponding to the paging record list, wherein a value of True in the list of indication information corresponding to an identifier of a terminal device in the paging record list indicates that there is downlink data for the terminal device, or a quantity X of identifiers of terminal devices at which the downlink data is to arrive; and in response to determining, based on the DCI, the paging record list and the first indication information, that there is the first downlink data corresponding to the apparatus, receive the first downlink data from the access network device through the communication interface.

15. The apparatus according to claim 14, wherein the at least one bit of the DCI comprises second indication information, and the second indication information comprises one bit of a short messages field of the DCI or one bit of a reserved field of the DCI, wherein the one bit of the short messages field of the DCI or the one bit of the reserved field of the DCI indicates that there is the first downlink data to be sent to the apparatus.

16. The apparatus according to claim 14, wherein the DCI further comprises third indication information, the third indication information comprises a data frequency-domain offset or a data time-domain offset, the data frequency-domain offset indicates an offset of a frequency-domain location for sending the downlink data relative to a frequency-domain location for sending the paging message, and the data time-domain offset indicates an offset of a time-domain location for sending the downlink data relative to a time-domain location for sending the paging message.

17. The apparatus according to claim 14, wherein the apparatus is further caused to:
receive system information from the access network device, wherein the system information indicates a time-frequency location of the first downlink data.

18. The apparatus according to claim 17, wherein the system information comprises fourth indication information, the fourth indication information comprises a data frequency-domain offset or a data time-domain offset, the data frequency-domain offset indicates an offset of a frequency-domain location for sending the downlink data relative to a frequency-domain location for sending second paging message, and the data time-domain offset indicates an offset of a time-domain location for sending the downlink data relative to a time-domain location for sending the second paging message.

19. The method according to claim 1, wherein the quantity X indicates that there is the downlink data for a first X terminal identifiers of the paging record list.

20. The method according to claim 1, wherein the quantity X indicates that there is the downlink data for a last X terminal identifiers of the paging record list.

* * * * *

UNITED STATES PATENT AND TRADEMARK OFFICE
CERTIFICATE OF CORRECTION

PATENT NO. : 12,408,140 B2
APPLICATION NO. : 17/852672
DATED : September 2, 2025
INVENTOR(S) : Wang et al.

Page 1 of 1

It is certified that error appears in the above-identified patent and that said Letters Patent is hereby corrected as shown below:

In the Claims

In Column 60, in Claim 14, Line 24, delete "list" and insert -- list, --.

Signed and Sealed this
Seventh Day of October, 2025

John A. Squires
*Director of the United States Patent and Trademark Office*